(12) United States Patent
Straza et al.

(10) Patent No.: US 9,126,387 B2
(45) Date of Patent: Sep. 8, 2015

(54) FORMED CORE SANDWICH STRUCTURES

(76) Inventors: George C. P. Straza, San Diego, CA (US); George T. Straza, II, San Diego, CA (US); Geosef T. Straza, San Diego, CA (US)

( * ) Notice: Subject to any disclaimer, the term of this patent is extended or adjusted under 35 U.S.C. 154(b) by 844 days.

(21) Appl. No.: 13/386,640

(22) PCT Filed: Jul. 22, 2010

(86) PCT No.: PCT/US2010/042956
§ 371 (c)(1),
(2), (4) Date: May 22, 2012

(87) PCT Pub. No.: WO2011/011634
PCT Pub. Date: Jan. 27, 2011

(65) Prior Publication Data
US 2012/0231214 A1    Sep. 13, 2012

Related U.S. Application Data

(60) Provisional application No. 61/227,763, filed on Jul. 22, 2009.

(51) Int. Cl.
*B32B 1/00* (2006.01)
*B32B 3/12* (2006.01)
(Continued)

(52) U.S. Cl.
CPC ... *B32B 3/28* (2013.01); *B32B 3/12* (2013.01); *E04C 2/3405* (2013.01); *E04C 2002/3438* (2013.01); *Y10T 428/24273* (2015.01); *Y10T 428/24562* (2015.01)

(58) Field of Classification Search
CPC .............. B32B 1/00; B32B 3/00; B32B 3/12; B32B 3/28; B32B 3/30; E04C 2/30; E04C 2/365; E04C 2/20; E04C 2/326; E04C 2/3405; E04C 2002/3422; E04C 2002/3433; E04C 2002/3455
USPC ........ 428/72, 166, 178, 180; 52/793.1, 783.1, 52/789.1

See application file for complete search history.

(56) References Cited

U.S. PATENT DOCUMENTS 3,011,602 A    12/1961   Ensrud et al.
3,086,899 A *  4/1963    Ingraham et al. ............. 428/158
(Continued)

FOREIGN PATENT DOCUMENTS

FR           2 839 995       11/2003
WO       WO-03/047848        6/2003
WO       WO-2009/108712      9/2009

OTHER PUBLICATIONS

International Preliminary Report on Patentability for PCT/US2010/042956, issued Jan. 24, 2012, 7 pages.
(Continued)

*Primary Examiner* — Catherine A Simone
(74) *Attorney, Agent, or Firm* — Morrison & Foerster LLP

(57) ABSTRACT

A formed core comprising a first and second plurality of pyramidal frustum bases, the first plurality of pyramidal frustum bases extending in a first direction and the second plurality of pyramidal frustum bases extending in a second direction, and wherein each pyramidal frustum base comprises: a node comprising a convex regular polygon, the convex regular polygon comprising a plurality of sides oriented in a first plane and wherein each side of the polygon of the node of each of the first plurality of pyramidal frustum bases is parallel to a side of the polygon of the node of at least one of the second plurality of pyramidal frustum bases; a plurality of faces extending from each of the sides of the polygon of each node of the first plurality of frustum bases to a side of the polygon of each of the second plurality of frustum bases.

10 Claims, 25 Drawing Sheets

(51) Int. Cl.
*B32B 3/28* (2006.01)
*B32B 3/30* (2006.01)
*E04C 2/34* (2006.01)

(56) References Cited

U.S. PATENT DOCUMENTS 3,525,663 A 8/1970 Hale
3,834,487 A 9/1974 Hale
4,495,237 A 1/1985 Patterson
5,894,045 A 4/1999 Desrondiers
6,713,008 B1 3/2004 Teeter

OTHER PUBLICATIONS

International Search Report for PCT/US10/42956, mailed Sep. 20, 2010, 1 page.
Extended European Search Report for EP 10802922.4, mailed Jul. 15, 2013.

* cited by examiner

FORMED CORE SANDWICH STRUCTURES

CROSS-REFERENCE TO RELATED APPLICATIONS

This application is the national phase of PCT application PCT/US2010/042956 having an international filing date of 22 Jul. 2010, which claims benefit of U.S. Provisional Application No. 61/227,763 filed 22 Jul. 2009. The contents of the above parent applications are incorporated by reference herein in their entirety.

FIELD OF THE INVENTION

This disclosure generally relates to formed core sandwich structures and, more particularly, to formed cores with generally pyramidal frustums.

BACKGROUND OF THE INVENTION

Formed core sandwich structures are used in turbine, scram-jet, pulse-jet, rocket, and similar engines, as well as in their structures and housings. In such applications, the core material must be lightweight and capable of withstanding engine vibration and heat, as well as shocks from turbulence and landing. The formed structures must also be capable of retaining their strength as they withstand extreme temperatures for extended periods (e.g., 800-1500° F.), along with repeated heating-cooling cycles.

Typically, the materials that satisfy the above requirements do not allow superplastic forming at economically feasible temperatures and pressures, so forming of the core sheet leads inevitably to thinning of the already thin stock material. This thinning, combined with the large tensile forces required to form the desired core shapes, leads to fractures of the core sheet, which consequently limits the depth to which the core sheet can be drawn. Moreover, when a desired depth is achievable, the thinnest region of the formed core material is typically the point of failure, and thus is a factor in determining the ability of the sandwich structure to withstand torsion and bending loads and in determining the volume density of the finished sandwich structure. As a result of the above restrictions, there is a limit to the depths at which core materials can be drawn using known techniques.

Thus, there exists a need for a formed core that is able to resist thinning and fracturing when undergoing large tensile forces during formation of the completed sandwich into the desired shape.

SUMMARY OF THE INVENTION

The invention provides formed core sandwich structures which are able to resist thinning and fracturing when undergoing large tensile forces during formation. In one embodiment, a formed core comprises a first and second plurality of pyramidal frustum bases. The first plurality of pyramidal frustum bases extend in a first direction and the second plurality of pyramidal frustum bases extend in a second direction, which is different from the first direction. Each pyramidal frustum base comprises a node, wherein the node comprises a convex regular polygon with a plurality of sides. The convex regular polygon is oriented in a first plane and each side of the polygon of the node of each of the first plurality of pyramidal frustum bases is parallel to a side of the polygon of the node of at least one of the second plurality of pyramidal frustum bases. Each of a plurality of faces extends from each of the sides of the polygon of each node of the first plurality of frustum bases to a side of the polygon of each of the second plurality of frustum bases. Each pyramidal frustum base further comprises at least one cross-section in a second plane parallel to the first plane, wherein the first and second planes are not co-planar and wherein at least one cross-section comprises a polygon with the same number of sides as the polygon of the node.

In another embodiment, a formed core sandwich structure comprises an inner skin, an outer skin, and a formed core. The formed core comprises a first and second plurality of pyramidal frustum bases. The first plurality of pyramidal frustum bases extend in a first direction and the second plurality of pyramidal frustum bases extend in a second direction, which is different from the first direction. Each pyramidal frustum base comprises a node, wherein the node comprises a convex regular polygon with a plurality of sides. The convex regular polygon is oriented in a first plane and each side of the polygon of the node of each of the first plurality of pyramidal frustum bases is parallel to a side of the polygon of the node of at least one of the second plurality of pyramidal frustum bases. Each of a plurality of faces extends from each of the sides of the polygon of each node of the first plurality of frustum bases to a side of the polygon of each of the second plurality of frustum bases. Each pyramidal frustum base further comprises at least one cross-section in a second plane parallel to the first plane, wherein the first and second planes are not co-planar and wherein at least one cross-section comprises a polygon with the same number of sides as the polygon of the node.

In yet another embodiment, a formed core sandwich structure comprises an inner skin, an outer skin, and a formed core. The formed core comprises a plurality of pyramidal frustum bases extending in the same direction from a base sheet. Each pyramidal frustum base is separated from another base by a distance greater than twice the width of the pyramidal frustum base in the direction toward the other base. Each pyramidal frustum base comprises a node, wherein the node comprises a convex regular polygon with a plurality of sides. Each of the pyramidal frustum bases comprises a plurality of faces, each one which extends from a side of the polygon of the node of the pyramidal frustum base to the base sheet.

DETAILED DESCRIPTION OF EXEMPLARY EMBODIMENTS

Figure 1:
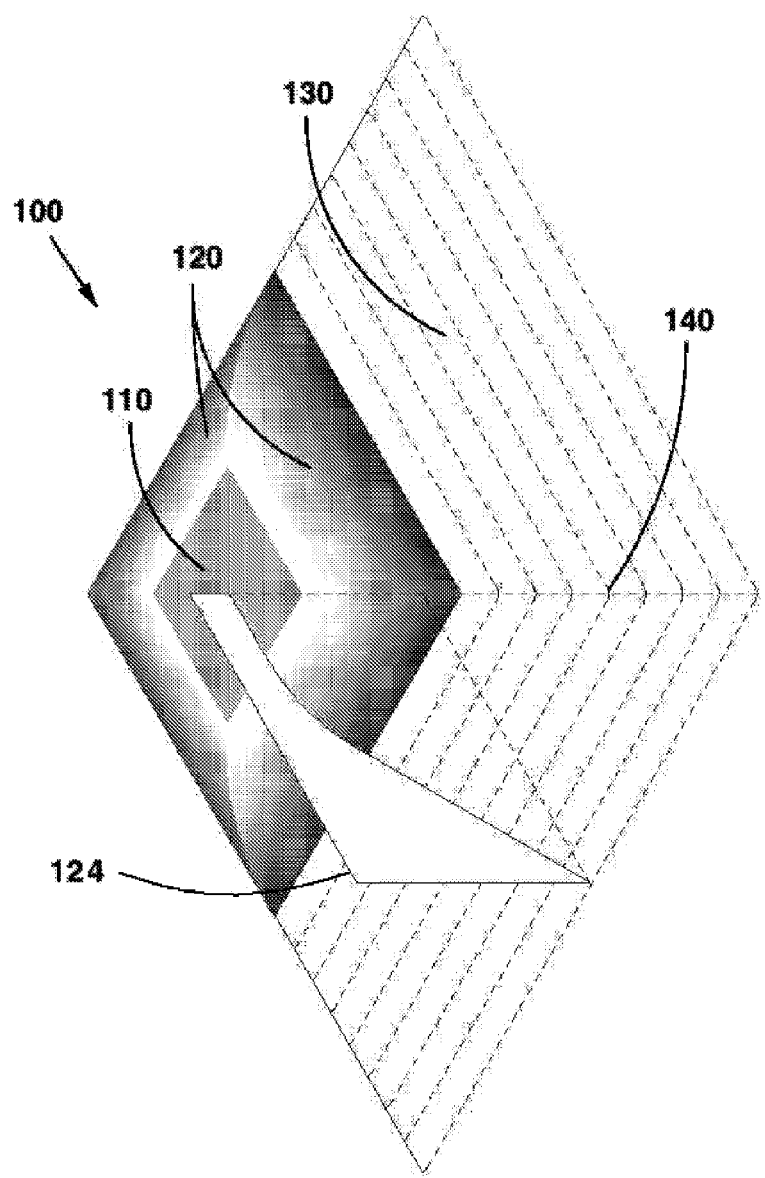
FIG. 1 is an isometric view of a pyramidal frustum base of a formed core, according to an exemplary embodiment of the invention.

In the following description of exemplary embodiments, reference is made to the accompanying drawings which form a part hereof, and in which it is shown by way of illustration, specific exemplary embodiments in which the invention can be practiced. It is to be understood that other embodiments can be used and structural changes can be made without departing from the spirit and scope of the invention.

Described herein are formed core sandwich structures which are able to resist thinning and fracturing when undergoing large tensile forces, thereby permitting greater depths of draw. These structures are capable of retaining their strength under extreme temperatures for extended periods (e.g., 800-1500° F.), and of withstanding repeated heating and cooling cycles and very significant shock and vibration forces. Several embodiments are aimed at surpassing the depth of draw of traditional formed cores, while maintaining an appropriate balance between crush, shear, torsion, and bending strengths. Other embodiments are drawn to depths where traditional formed cores do not fail, but these embodiments are aimed at producing cores that have lower internal stresses and that are able to withstand greater vibration and external stresses than traditional formed cores.

In one embodiment, a formed core comprises a first and second plurality of pyramidal frustum bases. The first plurality of pyramidal frustum bases extend in a first direction and the second plurality of pyramidal frustum bases extend in a second direction, which is different from the first direction. Each pyramidal frustum base comprises a node, wherein the node comprises a convex regular polygon with a plurality of sides. The convex regular polygon is oriented in a first plane and each side of the polygon of the node of each of the first plurality of pyramidal frustum bases is parallel to a side of the polygon of the node of at least one of the second plurality of pyramidal frustum bases. Each of a plurality of faces extends from each of the sides of the polygon of each node of the first plurality of frustum bases to a side of the polygon of each of the second plurality of frustum bases. Each pyramidal frustum base further comprises at least one cross-section in a second plane parallel to the first plane, wherein the first and second planes are not co-planar and wherein at least one cross-section comprises a polygon with the same number of sides as the polygon of the node.

In another embodiment, a formed core sandwich structure comprises an inner skin, an outer skin, and a formed core. The formed core comprises a first and second plurality of pyramidal frustum bases. The first plurality of pyramidal frustum bases extend in a first direction and the second plurality of pyramidal frustum bases extend in a second direction, which is different from the first direction. Each pyramidal frustum base comprises a node, wherein the node comprises a convex regular polygon with a plurality of sides. The convex regular polygon is oriented in a first plane and each side of the polygon of the node of each of the first plurality of pyramidal frustum bases is parallel to a side of the polygon of the node of at least one of the second plurality of pyramidal frustum bases. Each of a plurality of faces extends from each of the sides of the polygon of each node of the first plurality of frustum bases to a side of the polygon of each of the second plurality of frustum bases. Each pyramidal frustum base further comprises at least one cross-section in a second plane parallel to the first plane, wherein the first and second planes are not co-planar and wherein at least one cross-section comprises a polygon with the same number of sides as the polygon of the node.

In yet another embodiment, a formed core sandwich structure comprises an inner skin, an outer skin, and a formed core. The formed core comprises a plurality of pyramidal frustum bases extending in the same direction from a base sheet. Each pyramidal frustum base is separated from another base by a distance greater than twice the width of the pyramidal frustum base in the direction toward the other base. Each pyramidal frustum base comprises a node, wherein the node comprises a convex regular polygon with a plurality of sides. Each of the pyramidal frustum bases comprises a plurality of faces, each one which extends from a side of the polygon of the node of the pyramidal frustum base to the base sheet.

In yet another embodiment, a die-pair for forming a core sheet comprises a first and second die. Each die comprises a sheet generally orientated in a first plane, a plurality of columns, and a plurality of pyramidal frustums. Each column extends in a direction perpendicular to the first plane and comprises a first column end and a second column end, wherein the first column end is attached to the sheet, and wherein the second column end comprises a polygonal surface. Each of the pyramidal frustums comprises a first frustum end and second frustum end. The first frustum end is attached to the second column end and comprises a polygonal surface of equal size and shape to the polygonal surface of the second column end. The second frustum end is narrower than the first frustum end and comprises a polygonal surface of equal shape to the polygonal surface of the first frustum end.

FIG. 1 is an isometric view of a pyramidal frustum base 100 of a formed core, according to an exemplary embodiment of the invention. Pyramidal frustum base 100 comprises polygonal node 110, cylindrical transitions regions 120, and faces 130. Cylindrical transition regions 120 connect tangentially to polygonal node 110 and faces 130. Pairs of faces 130 of a pyramidal frustum base are connected by corner joints 140. Finally, FIG. 1 includes cut-away 124, which does not form part of the structure of pyramidal frustum base 100, but is included to aid the reader's appreciation of the interrelationship of the base's structural features.

As used herein, the term "pyramidal frustum" may be understood to refer to a portion of a pyramid separated by two planes. The two planes may or may not be parallel. Further, although pyramidal frustum base 100 is illustrated as having a square base, in alternative embodiments, other types of polygons could be used to form the pyramid.

In some embodiments, pyramidal frustum base 100 is formed using sheets of material stretched over die posts of a particular configuration. In regions where the core material does not contact the die, the formed core may take a variety of shapes, such as regions of negative Gaussian curvature, for example. Regions of the material that are in direct contact with the die will result in the formed core taking the shape of the die in that region. Pyramidal frustum base 100 is such a region. Hence, pyramidal frustum base 100 may alternatively be referred to herein as the shape of the die posts used to form the core or the final shape of elements of the formed core. Further, a cross-section of the pyramidal frustum base of some embodiments, taken in a plane parallel to the plane of the node surface, may be polygonal. These polygonal cross-sections of the pyramidal frustum base correspond to the regions of the core material which have made direction contact with the die.

It has been found that replacing traditional round die posts with pyramidal frustum die posts reduces the stress in the core material during forming, thereby reducing fracturing, and consequently enabling deeper depths of draw. While one of ordinary skill in the art would assume that the corners 140 of the pyramid would lead to tearing of the sheet, it has been found that the pyramidal frustum die posts of the invention actually reduce tearing during formation of the core. The corners 140 are shown in some illustrations as single straight vertical or slanted lines, and so appear to have sharp edges. In some embodiments, the corners 140 may be slightly rounded.

Cylindrical transition regions 120 further contribute to a deeper draw. To understand why, it should be first appreciated that when a material is stretched around a curved surface having zero Gaussian curvature, such as a cylinder, tension in the material is distributed across a significant length of the cylinder, in a direction parallel to the axis of the cylinder. Thus, cylindrical transition regions 120 facilitate the flow of core material during forming, thereby reducing stress along the path of maximum elongation, consequently reducing the risk of fracture. By contrast, the transition regions of traditional round-form dies are quasi-spherical, and therefore have positive Gaussian curvature. When a material is stretched around a curved surface having positive Gaussian curvature, the tension force causing the stretching is concentrated immediately along the path of maximum elongation, causing early fracture of the core material. Thus, by using the pyramidal frustum dies described herein, it is possible to draw the material to a significantly greater depth before fracturing. That is, for a given depth of draw, the internal stresses of the material being formed may be significantly lower when using these pyramid frustum die posts than the corresponding stresses experienced when using traditional round-form die posts.

When in a formed core, the flat surface of the polygonal node 100 can be used for attachment to skins or other formed core sheets. In one embodiment, the polygon node takes the form of a regular convex polygonal node. As used herein, the term "regular polygon" may be understood to refer to a multi-sided figure where all sides are of the same length. As used herein, the term "convex polygon" may be understood to refer to a multi-sided figure where every internal angle is less than 180°.

The significant advantages of pyramidal dies were confirmed in comparison tests with conical die posts. Both sets of dies were generated in such a fashion that cross-sections cut through a row of die post centers would be identical for the two sets of dies. The tests revealed more than 30% improvement in depth and, thus, a 30% reduction in the effective density of the core. In addition, the cores drawn using conical posts consistently failed at the point where the sheet met the post, indicating excessive contact tension at that point. By contrast, the cores formed with pyramidal posts consistently failed near the centers of the planes formed by two adjacent pyramid faces, indicating failure due to thinning of the material.

In one comparison test corresponding to an exemplary embodiment of the invention, the dies had a pitch (node-to-node separation) of 1.3 inches and a post height of 0.5 inches. Identical sheets of 0.008 inch thick stainless steel were pressed in both die sets using the same procedures in the same press. While sheets formed with the conical posts consistently failed at a depth of approximately 0.35 inches, the sheets formed with the pyramidal posts failed at a depth of approximately 0.46 inches.

Figure 2:
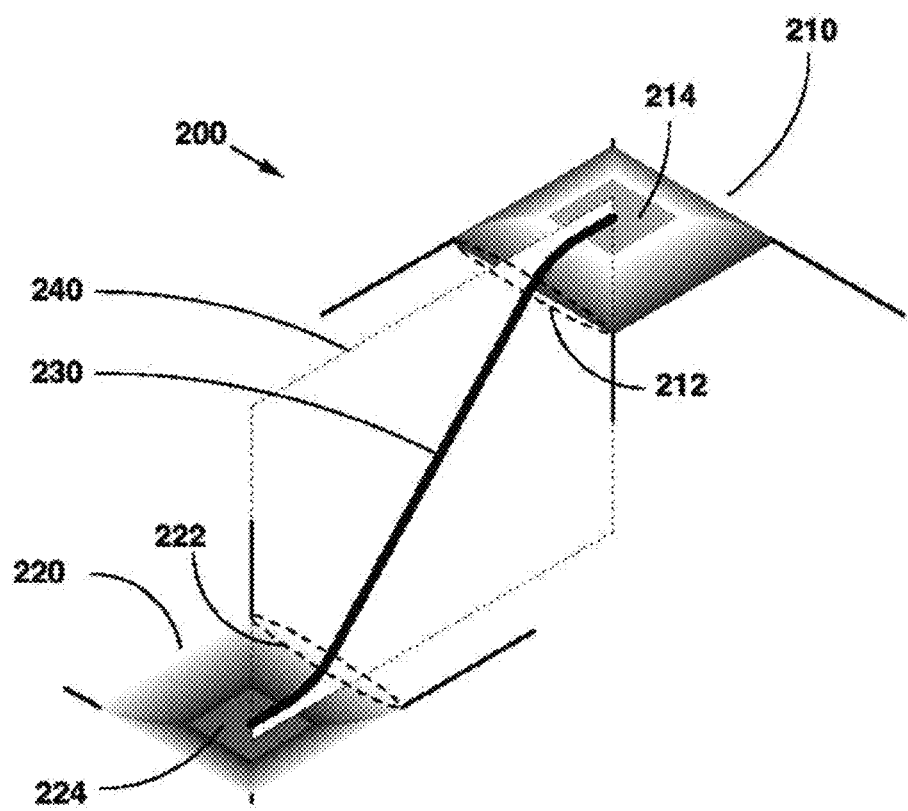
FIG. 2 is an isometric view of a pair of pyramidal frustum bases oriented in opposite directions and shows the path of maximum elongation taken by the core material during core formation, according to an exemplary embodiment of the invention.

FIG. 2 is an isometric view of a pair 200 of pyramidal frustum bases 210 and 220 oriented in opposite directions and shows the path of maximum elongation taken by the core material during core formation, according to an exemplary embodiment of the invention. Base 210 may correspond to pyramidal frustum base 100 of FIG. 1 and base 220 may correspond to an inverted pyramidal frustum base 100. The path of maximum elongation 230 taken by the core material during forming of the core extends from the center of node 214 to the center of node 224. FIG. 2 also includes cut-away 240, which does not form part of the structure of pair 200, but is included to aid the reader's appreciation of the interrelationship of the base's structural features.

In traditional die posts, the line of maximum elongation is the focal point for tension during core formation, as described above. For pair 200, however, this linear strain may be distributed over significant widths, 212 and 222, of the cylindrical transition region. In some embodiments, the sides of the polygonal nodes 214 and 224 are oriented directly towards the sides of opposite-facing nodes. This orientation permits further distribution of the tensile forces produced during core formation.

Pair 200 may comprise just two bases of an array of bases in a formed core. In a direction toward the viewer, the base adjacent (not shown) to base 210 will be oriented in the same direction. The same is true of the base adjacent (not shown) to base 220. In some embodiments, this configuration yields minimum elongation, and therefore minimum stress, in that direction, which thereby prevents the relatively sharp corners of the square pyramid from initiating failure.

The slope of the line of maximum elongation 230, and hence the slope of faces of the formed core, may be determined by the distance between the node centers. In one embodiment, the cell walls are sloped near 45 degrees from vertical, providing a compromise between ease and economy of forming, sandwich crush strength, and sandwich rigidity. Further, in some embodiments, using the smallest node surface area that is consistent with adequate core-to-skin adhesion permits the greatest depth of draw for a given sidewall slope. The result is that stress in the formed core can be minimized, permitting a deeper draw of the core without fracture and resulting in a lower density sandwich with a greater rigidity.

Figure 3:
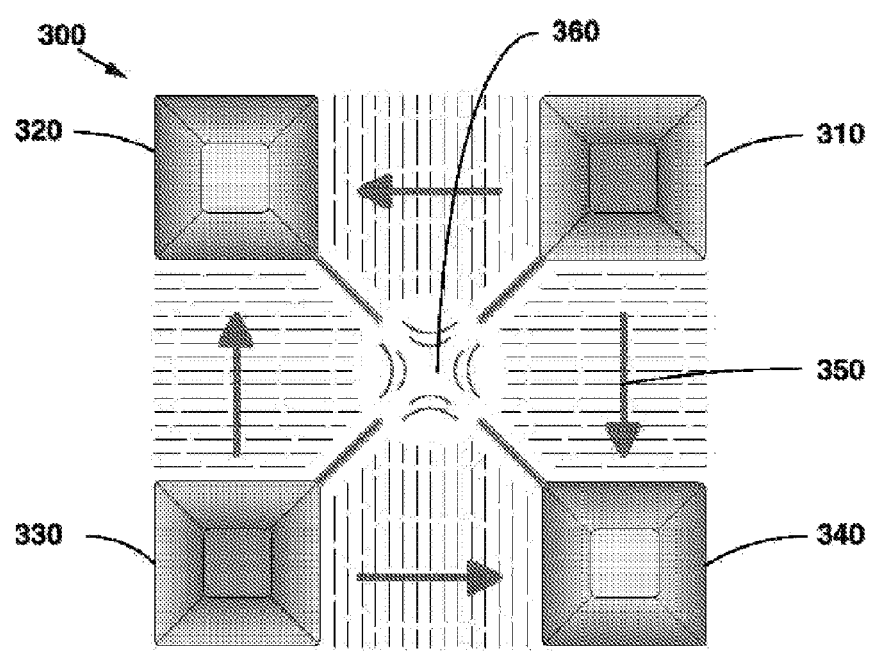
FIG. 3 is a top view of a region of negative Gaussian curvature between adjacent pyramidal frustum bases, according to an exemplary embodiment of the invention.

FIG. 3 is a top view of a region of negative Gaussian curvature 360 between adjacent pyramidal frustum bases, according to an exemplary embodiment of the invention. A set 300 of four pyramidal frustum bases 310, 320, 330, and 340 are connected by the region of negative Gaussian curvature 360. Nodes 320 and 340 are higher than nodes 310 and 330 and the arrows 350 represent the direction of a downward slope from one node to another. For example, the face connecting node 310 and 320 is sloped upward from node 310 to node 320

Placing compact regions of negative Gaussian curvature at the region where the faces of the pyramidal frustum bases meet enables the core material to flow with minimum restriction and minimum stress during core formation. In one embodiment, the regions of negative Gaussian curvature are formed by configuring the core material to contact only a small portion of the die surface. In one embodiment, for example, a maximum of 27% of the core material contacts the die. This small area of contact allows a negative Gaussian curvature 360 to naturally occur in the forming process, with minimum stress being caused in the part. In some embodiments, the sheet may be drawn to a depth/pitch ratio of 0.35/1 or more, depending on the original sheet thickness and anneal condition. Thus, by avoiding contact with the dies, a small region of negative Gaussian curvature at the mid-plane section of the core can facilitate a greater depth/pitch ratio during core formation. After formation, the compact negative Gaussian curvature strengthens the resistance of the core to both compressive and shear forces.

In some embodiments, the forming dies are configured to make contact with the sheet of core material at the polygonal node surface, the cylindrical transition regions, and the outer portion of the faces. In further embodiments there is no friction between the dies and the core material in the remainder of the cell, and thus the core material is able to flow without restriction from regions of lower stress (areas between nodes in the same orientation) into regions of higher stress (areas between nodes in different orientations). This flow of core material may be used to generate the compact regions of negative Gaussian curvature 360 at the junctions of four neighboring cells. The process whereby the regions of negative Gaussian curvature are formed is described in more detail below with reference to FIG. 21.

Figure 4:
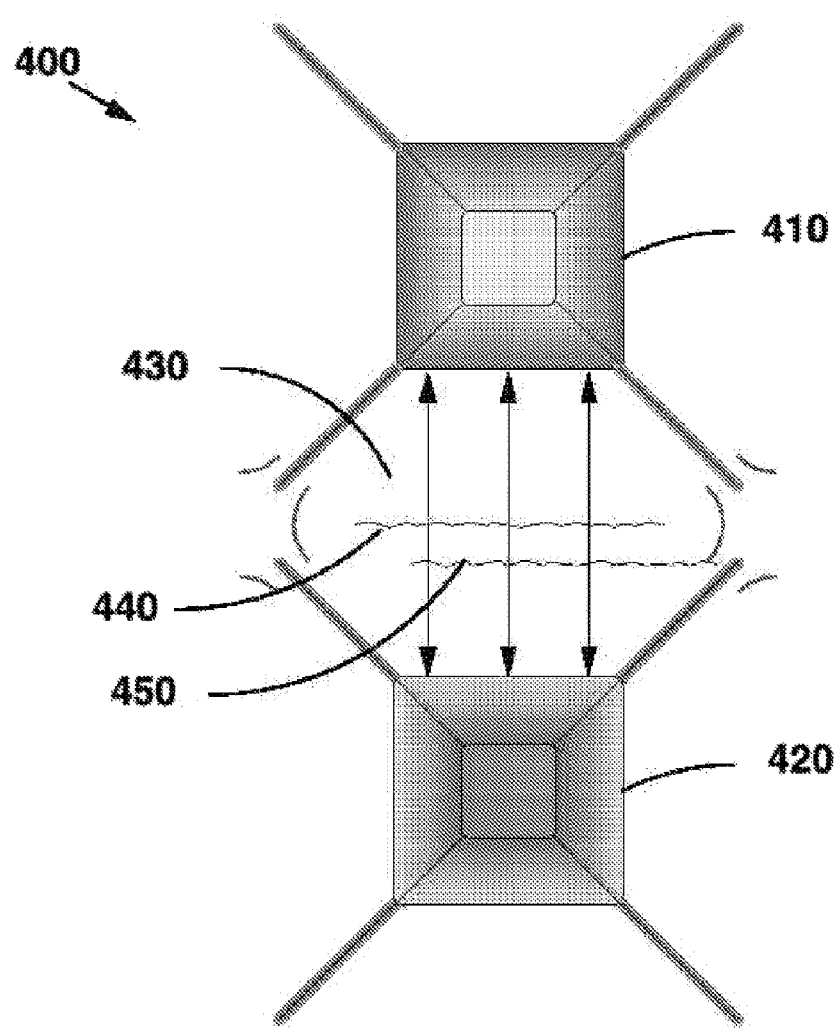
FIG. 4 is a top view of a pair of pyramidal frustum bases illustrating the typical failure modes when the formed core is subjected to excessive depths of draw, in accordance with embodiments of the invention.

FIG. 4 is a top view of a pair of pyramidal frustum bases 410 and 420 illustrating the typical failure modes 440 and 450 when the formed core is subjected to excessive depths of draw, in accordance with embodiments of the invention. A pair 400 of oppositely oriented pyramidal frustum bases 410 and 420 are joined by face 430. Testing has shown that the vast majority of fractures that occur with excessive draw depth are in the location and orientation illustrated by the upper jagged line 440. These fractures occur very close to the center of the essentially flat plane formed by two adjacent pyramidal frustum bases and are consistently linear fractures perpendicular to the path of maximum elongation. Occasionally fractures occur in the location and orientation illustrated by the lower jagged line 450. These fractures are consistently linear fractures perpendicular to the path of maximum elongation, but which initiate at or near the end of a pyramid corner.

Testing has shown that when a similar core structure is formed using traditional round die posts, failure due to excessive depth of draw consistently manifests as curved fractures that originate very near to the point where the path of maximum elongation meets the die post. These fractures occur at significantly smaller draw depths than is the case using pyramidal die posts.

Figure 5:
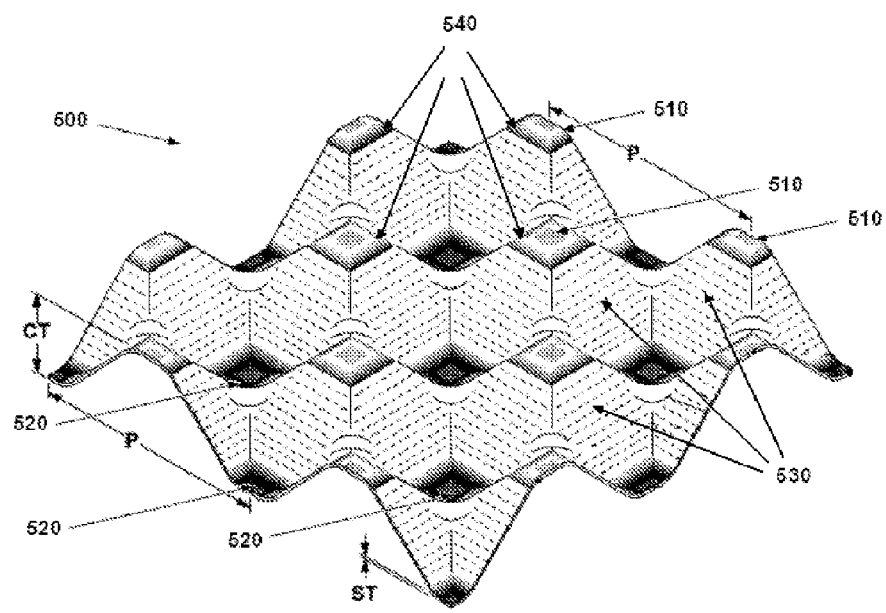
FIG. 5 is an isometric view of a formed core, according to an exemplary embodiment of the invention.

FIG. 5 is an isometric view of a formed core, according to an exemplary embodiment of the invention. Formed core 500 includes a plurality of pyramidal frustum bases 510 at an upper elevation, a plurality of pyramidal frustum bases 520 at a lower elevation, and faces 530 joining adjacent pairs of pyramidal frustum bases. The following dimensions are also illustrated in FIG. 5: sheet thickness (ST), node pitch (or distance between nodes) (P), and core thickness (CT).

As can be seen in FIG. 5, the pyramidal frustum bases form an array of nodes in alternating directions. In some embodiments, the core sheet is a relatively thin sheet, having a thickness which is appropriate to the requirements of a particular application. In some embodiments, the core sheet is formed into a lightweight cellular structure that becomes the core of a sandwich having stiffness as close as possible to that of a solid structure, but having a weight which is a fraction of the weight of the solid structure. The sheet can be any type of material that is formable and can be strongly bound to the sandwich skins. In some embodiments, high strength and/or high temperature materials are utilized. In some embodiments, the sheet core structure is optimized for the lowest possible density by using the pyramidal frustum bases, cylindrical transition regions, and regions of negative Gaussian curvature described above. In some embodiments, no portion of the central plane is visible after forming of the sheet.

In some embodiments, the separation between two adjacent nodes that face the same direction (i.e., P) is approximately three times the desired core thickness (i.e., CT). This separation may lead to optimum slopes of the pyramidal frustum faces 530.

In some embodiments, the formed portion of each pyramidal frustum base has a width approximately equal to four tenths of the node separation (P), thereby leaving a node flat of approximately one tenth of the node separation between opposing pyramidal frustum bases. This node flat may allow the sheet material to flow unrestricted from areas of low stress into areas of higher stress, and may facilitate the formation of the compact region of negative Gaussian curvature discussed herein. This flow of material facilitates forming the flat sheet into a core having maximum depth of draw without fracture and minimizes internal stress in the formed core sheet. In addition, the node flat may assure that the corresponding faces of pyramidal frustum bases merge into single planes with no step or other visible mark at the junction.

In some embodiments, the node has a flat width one twelfth to one tenth of the node separation (P). This value provides a desired depth of draw while still providing adequate surface area for adhesion between formed core sheets and the outer skins of the sandwich structure. In some embodiments, the cylindrical transition region has a radius approximately equal to the node width.

In some embodiments, the slope of the faces is set such that the faces of neighboring bases of different orientation merge into a single plane. For core sheets between two flat skins, this slope may be approximately 45°, which optimizes the balance between crush, torsion, flexure and other strengths. In some embodiments, this maximizes the transfer of forces between oppositely oriented bases and, therefore, between upper and lower skins. Core sheets to be used between curved skins may have different angles according to some embodiments.

In some embodiments, the junctions between adjacent faces of each pyramid form relatively sharp corners which act as stiffening edges reaching from the negative Gaussian curves near the mid plane section of the sheet to the start of the transitions to the node tip flat. In other embodiments, these corners may be slightly rounded.

Figure 6:
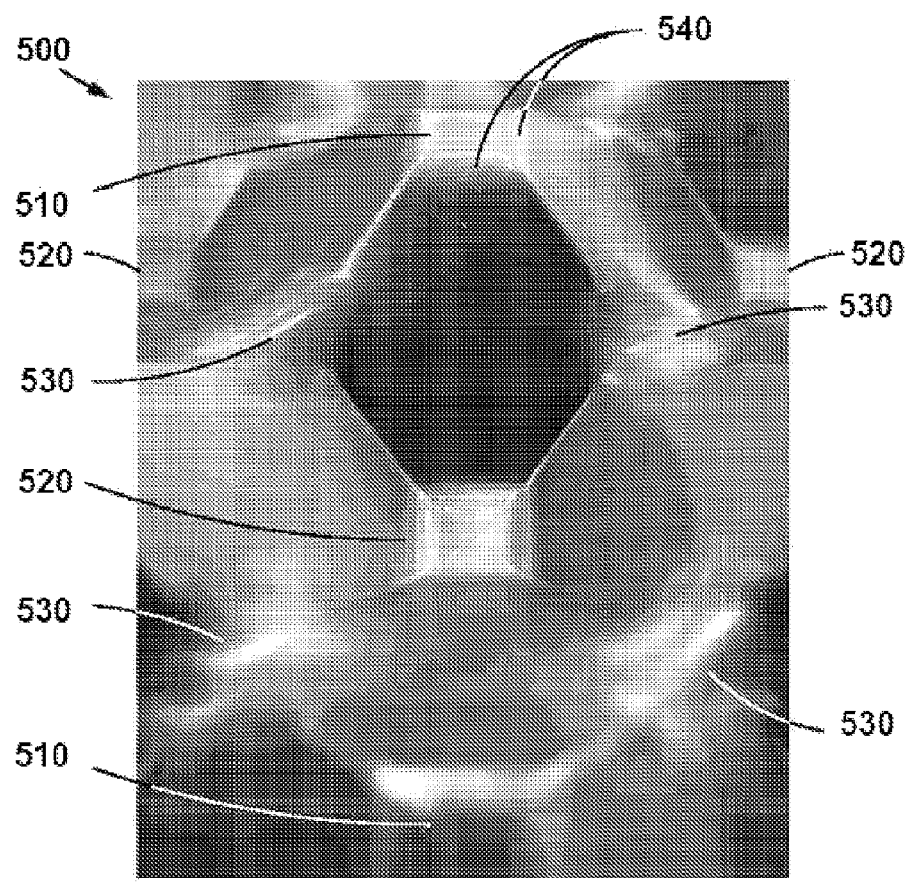
FIGS. 6-8 illustrate alternative views of the formed core of FIG. 5.
Figure 7:
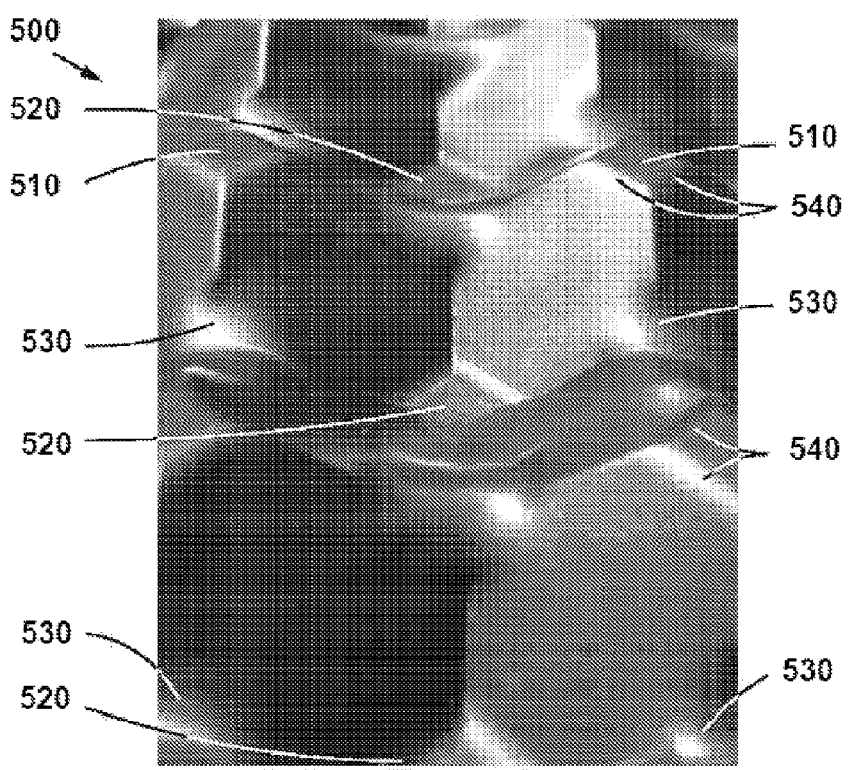
Figure 8:
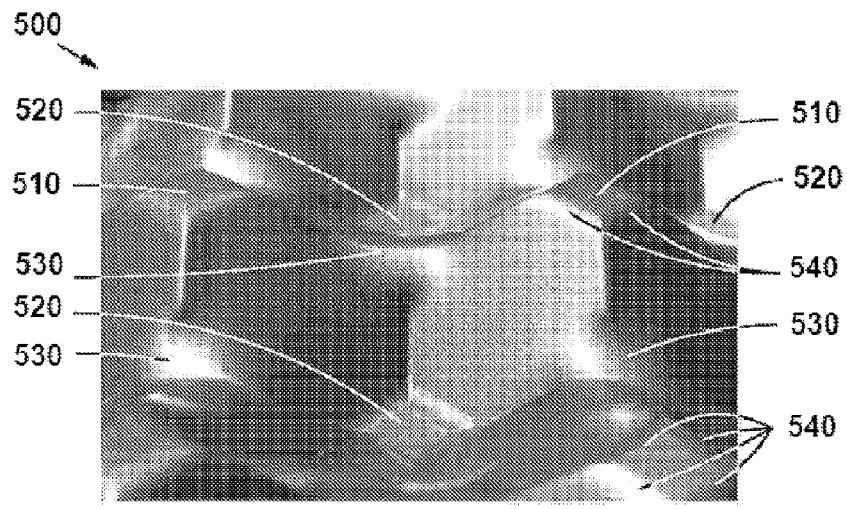

FIGS. 6-8 illustrate alternative views of formed core 500.

Figure 9:
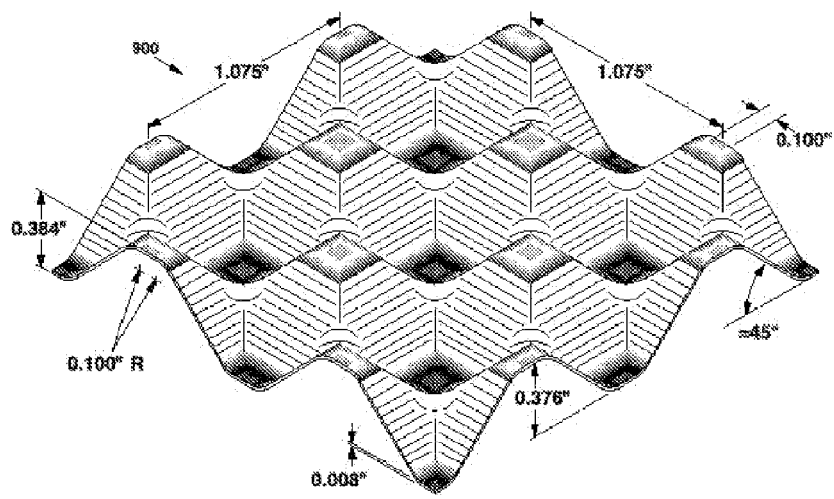
FIG. 9 is an isometric view of a formed core illustrating a selection of dimensions, according to an exemplary embodiment of the invention.

FIG. 9 is an isometric view of a formed core 900 illustrating a selection of dimensions, according to an exemplary embodiment of the invention. In this embodiment, the sheet thickness is 0.008 inches, the node pitch is 1.075 inches, the width of the polygonal node is 0.100 inches, the core thickness is 0.384 inches, the faces are sloped at approximately 45°, and the cylindrical transition regions have a radius of 0.100 inches.

Figure 10:
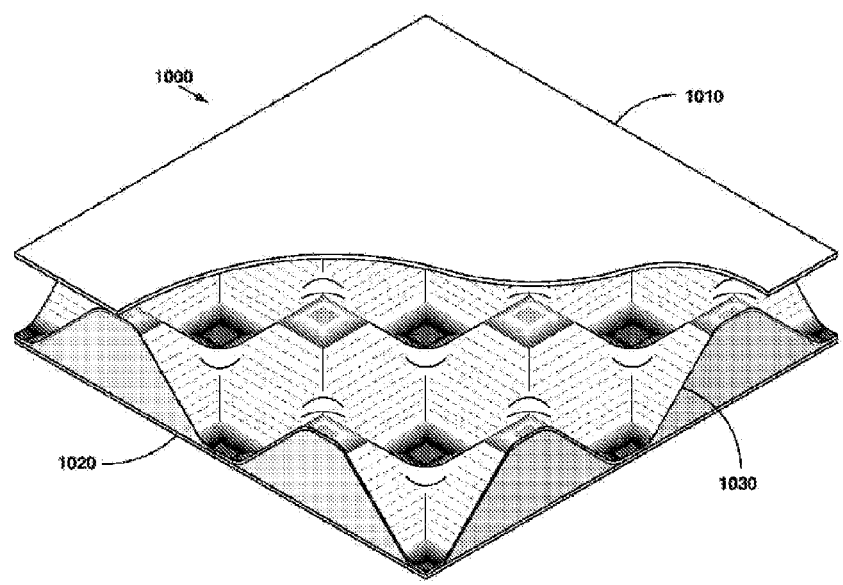
FIG. 10 is a cut-away isometric view of a formed core sandwich structure, according to an exemplary embodiment of the invention.

FIG. 10 is a cut-away isometric view of a formed core sandwich structure 1000, according to an exemplary embodiment of the invention. Formed core sandwich structure 1000 includes an upper skin 1010, a lower skin 1020, and a formed core 1030.

Figure 11:
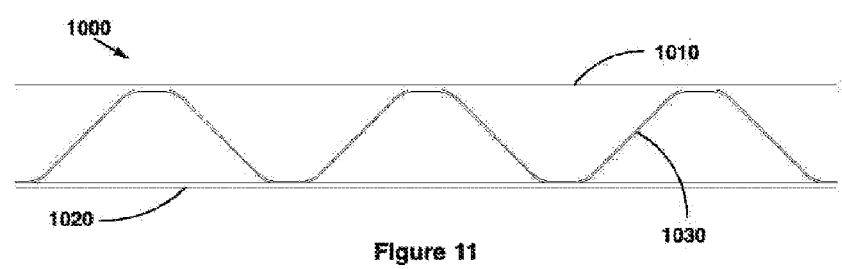
FIG. 11 is a cross-section of the sandwich of FIG. 10, cut through a row of node centers.

FIG. 11 is a cross-section of the sandwich of FIG. 10, cut through a row of node centers. This view illustrates the slope of the sidewalls of the bases at approximately 45°, which may provide the optimum combination of core formability, core thickness, compressive strength, and torsional/flexural strength. Note, however, that a different angle may be selected to favor one or more of the above properties without deviating from the scope of the invention.

While appropriate resistance and/or diffusion welds between the core nodes and the skins may provide adequate strength for many applications, in some embodiments a small area of brazing foil is added between the nodes and the skins, which, together with an appropriate vacuum or inert atmosphere brazing cycle, can add very little weight but significantly increase the strength of the resulting sandwich and, especially, its ability to withstand vibration according to some embodiments.

Figure 12:
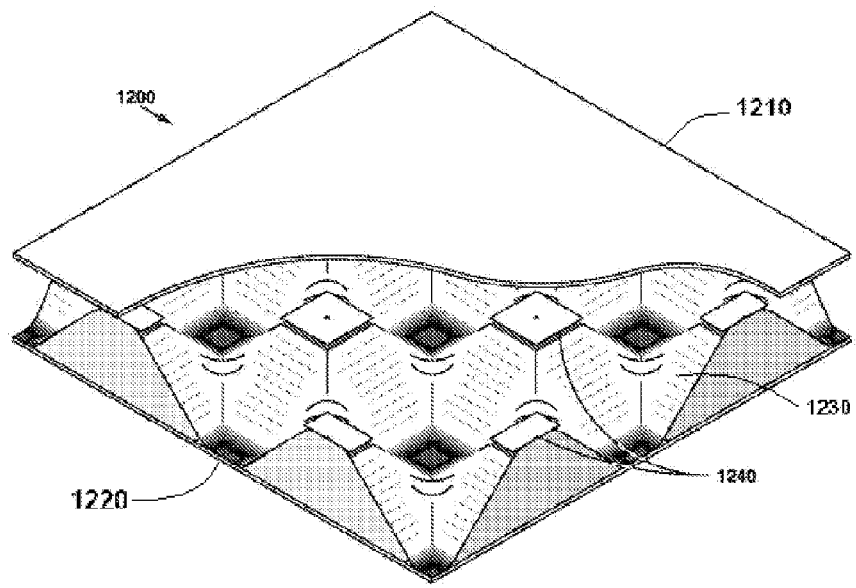
FIG. 12 is a cut-away isometric view of a formed core sandwich structure, illustrating attached squares of braze foil before brazing, according to an exemplary embodiment of the invention.

FIG. 12 is a cut-away isometric view of a formed core sandwich structure 1200, illustrating attached squares 1240 of braze foil before brazing, according to an exemplary embodiment of the invention.

Figure 13:
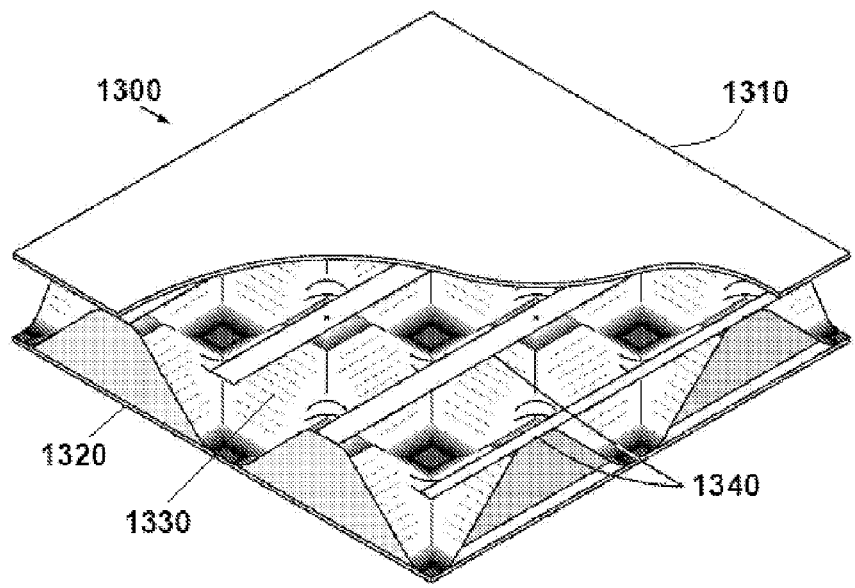
FIG. 13 is a cut-away isometric view of a formed core sandwich structure, illustrating attached strips of braze foil before brazing, according to an exemplary embodiment of the invention.

FIG. 13 is a cut-away isometric view of a formed core sandwich structure 1300, illustrating attached strips 1340 of braze foil before brazing, according to an exemplary embodiment of the invention. The strips 1340 of braze foil are placed along rows of nodes and effectively add stiffeners to the skins, both due to added material and due to surface tension drawing the skin material into shallow channels during the braze cycle. Note that other methods may be used if smoothness of the skin is a priority.

Figure 14:
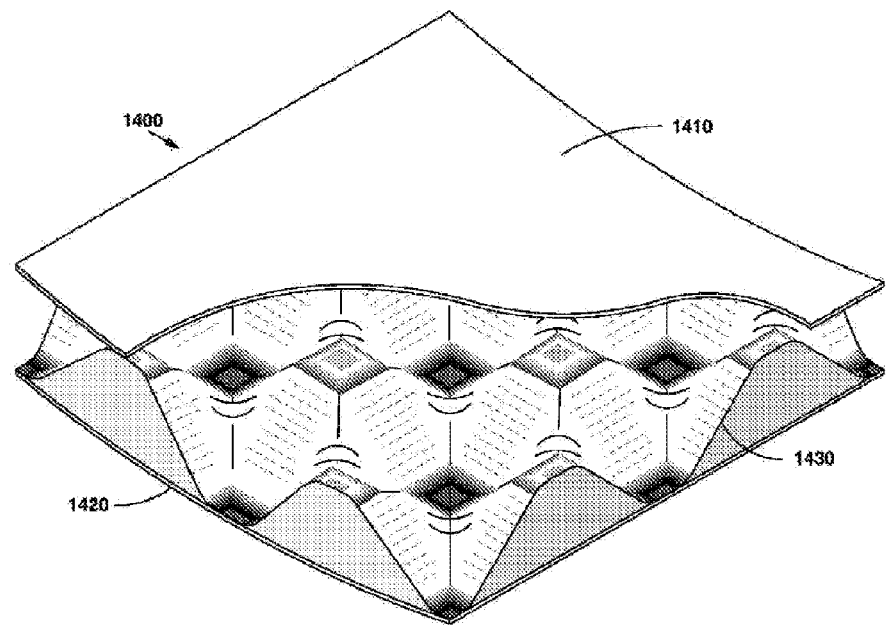
FIG. 14 is a cut-away isometric view of a curved formed core sandwich structure, according to an exemplary embodiment of the invention.

FIG. 14 is a cut-away isometric view of a curved formed core sandwich structure 1400, according to an exemplary embodiment of the invention. If the radius of curvature is very large compared to the sandwich thickness, pressing or rolling the flat sandwich of FIG. 10, for example, can produce this configuration. For greater curvatures (i.e., smaller radii), a custom core and pre-formed skins having the desired shapes can be produced before bonding. One or more such assemblies are then brazed together according to some embodiments. This process enables shapes to be assembled such as true cones and convex and concave quasi-cones (e.g., those used in turbine engine centerbodies). Although FIG. 14 shows a section of a cylinder, many other shapes including conical, spherical, and other compound curvatures are possible without deviating from the scope of the invention.

Figure 15:
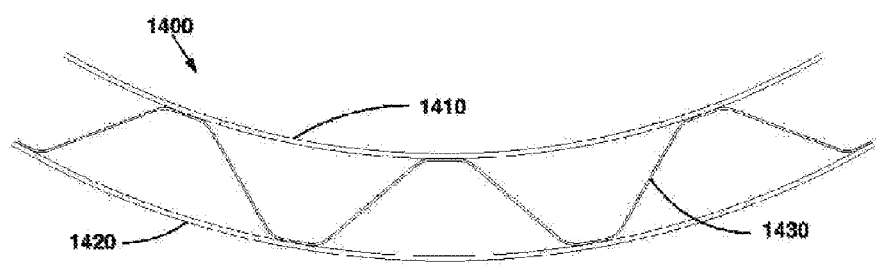
FIG. 15 is a cross-section of the sandwich of FIG. 14, cut through a row of node centers.

FIG. 15 is a cross-section of the sandwich of FIG. 14, cut through a row of node centers.

Figure 16:
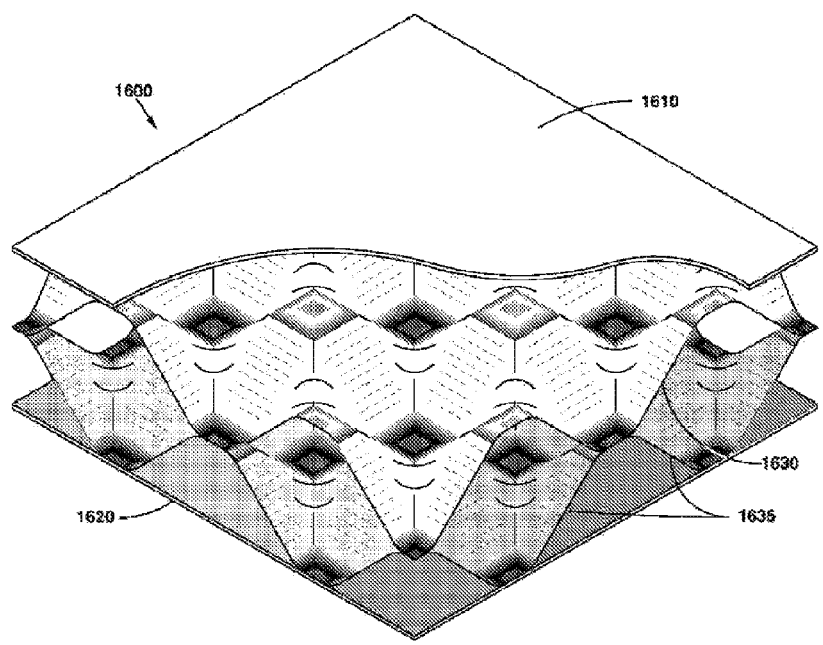
FIG. 16 is a cut-away isometric view of a four-layer formed core sandwich structure, according to an exemplary embodiment of the invention.

FIG. 16 is a cut-away isometric view of a four-layer formed core sandwich structure 1600, according to an exemplary embodiment of the invention. Formed core sandwich structure 1600 includes an upper skin 1610, a lower skin 1620, and formed cores 1630 and 1635.

In a three-layer sandwich structure, the sandwich thickness depends on the node pitch. A greater node pitch allows a greater depth of draw, but may also leave larger areas of unsupported skin between nodes. Adding one or more additional layers of core to the three-layer structure, with the core layers joined node-to-node, to create a four-layer sandwich like 1600, may increase the separation between skins without increasing the node pitch. In some embodiments, the increased skin separation gives the sandwich greater torsional and flexural strength, but without increasing the risk of localized skin crushing as could occur with larger node pitch.

Figure 17:
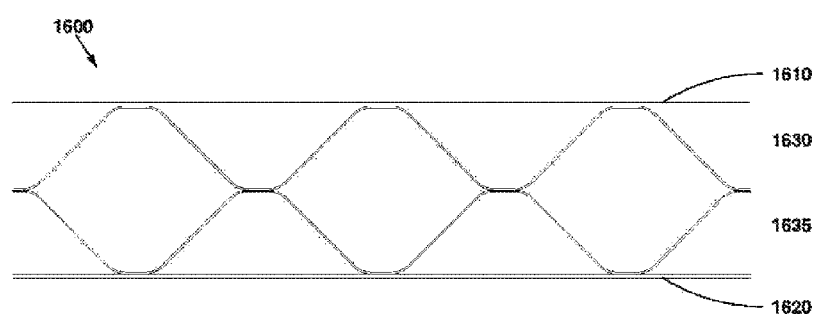
FIG. 17 is a cross-section of the sandwich of FIG. 16, cut through a row of node centers.

FIG. 17 is a cross-section of the sandwich of FIG. 16, cut through a row of node centers.

Figure 18:
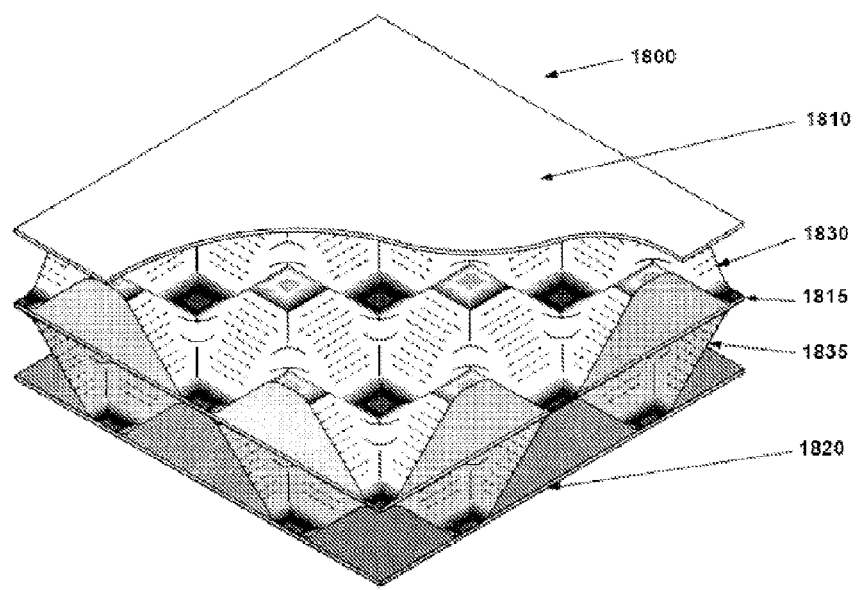
FIG. 18 is a cut-away isometric view of a five-layer formed core sandwich structure, according to an exemplary embodiment of the invention.

FIG. 18 is a cut-away isometric view of a five-layer formed core sandwich structure 1800, according to an exemplary embodiment of the invention. Formed core sandwich structure 1800 includes an upper skin 1810, a middle skin 1815, a lower skin 1820, and formed cores 1830 and 1835.

The five-layer sandwich may comprise the four-layer sandwich of FIG. 16 with the addition of a middle skin. In some embodiments, the addition of the middle skin gives the sandwich greater torsional and flexural strength. In some embodiments, the middle skin permits two separate fluid flow paths within the sandwich without requiring the fluid entry and exit locations to be coordinated with the cell locations.

Figure 19:
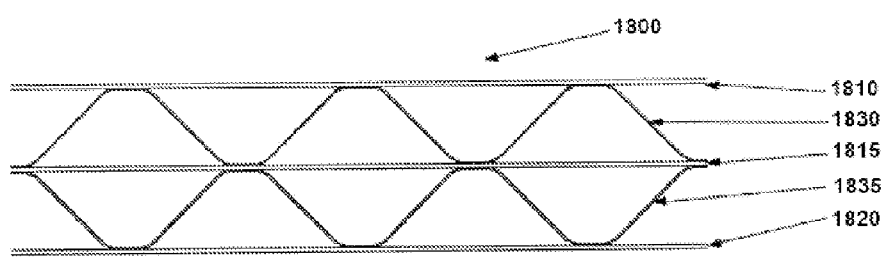
FIG. 19 is a cross-section of the sandwich of FIG. 18, cut through a row of node centers.

FIG. 19 is a cross-section of the sandwich of FIG. 18, cut through a row of node centers.

Figure 20:
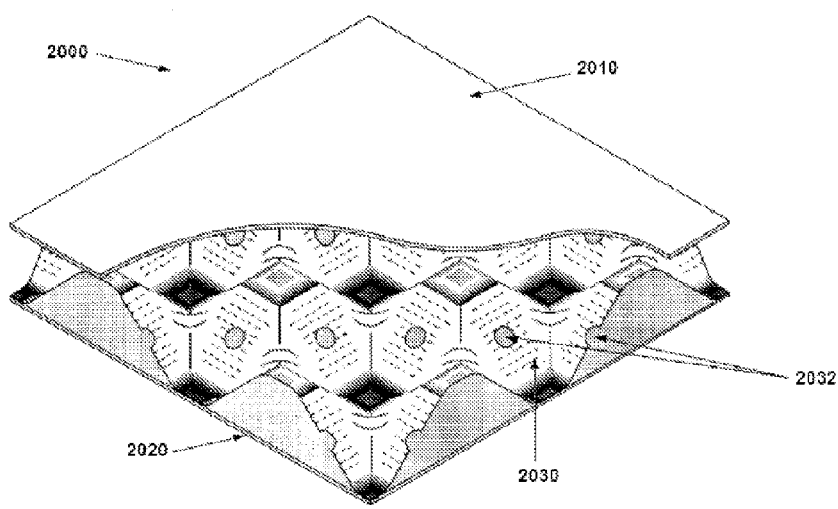
FIG. 20 is a cut-away isometric view of a perforated-core sandwich, according to an exemplary embodiment of the invention.

FIG. 20 is a cut-away isometric view of a perforated-core sandwich structure 2000, according to an exemplary embodiment of the invention. Formed core sandwich structure 2000 includes an upper skin 2010, a lower skin 2020, and a formed core 2030. Formed core 2030 further comprises perforations 2032.

In this embodiment, perforations 2032 exist in the core 2030 only, and enable fluid to flow along the core. In some embodiments, fluid enters at one end of the formed core and exits at the other. In other embodiments, one or both skins are perforated to allow fluid to enter and/or exit the core region. In further embodiments, a separate sealed region exists on each side of the core so that two different fluids can separately flow along the sandwich (e.g., a fuel and an oxidizer, or a hot fluid and a cold fluid). In other embodiments, the core and/or the skins are perforated to aid in sound attenuation, essentially acting as a muffler. The voids of the cellular structure can also be filled with appropriate materials to further aid the attenuation.

In yet another embodiment, thermal deflection due to large differences in temperature between skins can be reduced by thin layers of high thermal-conductive material added to both sides of the core sheet. These layers may assist in improving thermal conductivity, enabling heat to transfer from the hotter skin to the cooler skin.

Figure 21:
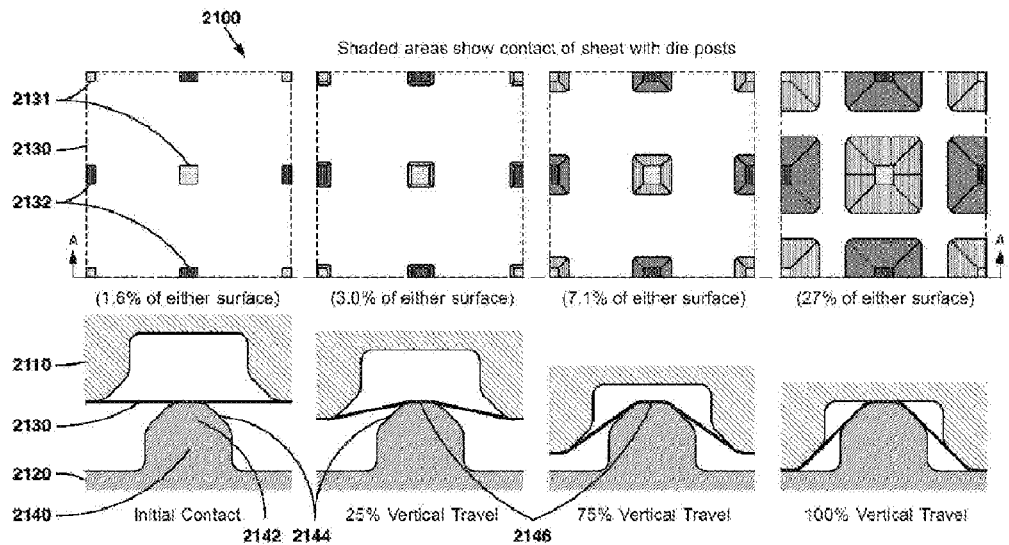
FIG. 21 illustrates four stages of a method of forming a core for use in formed core sandwich structure, according to an exemplary embodiment of the invention.

FIG. 21 illustrates four stages of a method of forming a core for use in a formed core sandwich structure, according to an exemplary embodiment of the invention. In each stage, the upper drawing of FIG. 21 is a top view of a sheet of core material 2130, showing the areas 2131 & 2132 of the sheet that are in contact with the dies. In each stage, the lower drawing of FIG. 21 is a cross section through a row of nodes, showing the upper die 2110, the lower die 2120, and the sheet of core material 2130. In each stage, the view of the sheet of core material in the lower drawing corresponds to section A-A of the upper drawing. Each die consists of a plurality of columns 2140, a plurality of pyramidal frustums 2142, each of the plurality of pyramidal frustums 2142 attached to a different one of the plurality of columns 2140, a plurality of faces 2144, and a plurality of frustum nodes 2146 opposite the associated column, each of the plurality of frustum nodes 2146 comprising a polygon.

The four stages shown are: (1) initial contact between the sheet of core material 2130 and dies 2110 and 2120, (2) 25% of the distance between the dies 2110 and 2120 has been bridged, (3) 75% of the distance between the dies 2110 and 2120 has been bridged, and (4) the dies 2110 and 2120 are fully coupled.

At the first stage, initial contact, the frustum nodes 2146 of the pyramidal frustums are the only points of contact between the sheet of core material 2130 and the dies 2110 and 2120. In the embodiment illustrated in FIG. 21, 1.6% of the surface of the sheet of the core material 2130 is in contact with the dies. However, it will be readily appreciated by one of ordinary skill in the art that this percentage may vary, depending on the size and shape of the polygon of the frustum node 2146 and the distance between the centers of the frustum nodes.

At the second stage, 25% vertical travel, the sheet of core material 2130 may now also make contact with a fraction of the cylindrical transition regions of the dies 2110 and 2120. The upper drawing illustrates that 3.0% of the surface of the sheet of the core material 2130 is in contact with the dies. As with the first stage, this percentage may be varied by varying the die geometries.

At the third stage, 75% vertical travel, the sheet of core material 2130 may now make contact with a larger fraction of the cylindrical transition regions of the dies 2110 and 2120. The upper drawing illustrates that 7.1% of the surface of the sheet of the core material 2130 is in contact with the dies. As above, this percentage may be different in other embodiments.

At the final stage, 100% vertical travel, the sheet of core material 2130 may now make contact with all of the cylindrical transition regions of the dies 2110 and 2120 and their faces 2144. The upper drawing illustrates that 27% of the surface of the sheet of the core material 2130 is in contact with the dies, which may differ for different embodiments.

As can be seen in FIG. 21, a portion of the sheet of core material 2130 makes no contact with the dies at any stage of the forming process. These contain the regions of negative Gaussian curvature described above and naturally occur in exemplary embodiments of the invention. These regions reduce stress during non-superplastic forming of high strength thin core sheets. In some embodiments, the spacing between the dies is critical to the efficacy of the region of negative Gaussian curvature. If the spacing is too large, the region of negative Gaussian curvature will have too little curvature, and the small pyramid corner stiffeners will not efficiently transfer forces from one node to its neighbors. If the spacing is too small, the regions of negative Gaussian curvature will be replaced by sharp bends formed by the corners of the pyramidal frustum bases, which may be potential initiation points for fracture of the core. It will be appreciated by one of ordinary skill in the art that the process by which regions of negative Gaussian curvature are produced for the pyramidal frustum bases described here could also be used for other core shapes. Although the plurality of columns 2140 are illustrated in FIG. 21 as having constant width in the direction perpendicular to the plane of the sheet, some embodiments may include columns which do not have a constant width. In those embodiments, the columns make no contact with the sheet of core material 2130 during any stage of the forming process.

As can also be seen in FIG. 21, the core material makes no contact with the faces of the pyramidal frustum bases until the very last stage of the process. This small area of contact may allow metal to flow unimpeded during the forming process from regions of lower tension into regions of higher tension, keeping stress at a minimum. In the embodiment illustrated in FIG. 21, the faces are sloped at 45° from the vertical. However, in other embodiments the faces may be sloped at a different angle, resulting in contact with the faces at an earlier stage of the process and even at no stage of the process.

Traditional forming die sets use pairs of dies, where usually one die is considered male, and the other is considered female. The protrusions of the male die fit into the hollows of the female die, such that the forming surfaces are essentially 3D mirror images of each other, with appropriate offsets according to the thickness of the sheet being formed. When these dies are pressed to full depth, each die is in contact with the corresponding surface of the formed sheet at virtually all points, so the shape of the formed sheet is entirely defined by the surfaces of the dies. Every curve of the formed sheet corresponds to a related curve on the die surfaces, and any flat or planar areas of the formed sheet correspond to related flats on the die surfaces. This intimate contact of the die surfaces with the surfaces of the sheet being formed causes a significant limitation in the ability of the sheet material to flow from regions of low stress into regions of higher stress, and thus limits the depth to which the material can be drawn before fracturing occurs.

The forming die sets of various embodiments of the invention also use pairs of dies, but there may be no way to distinguish one die as male and the other as female. In some embodiments, both dies are male, having protrusions that press into the sheet being formed. The process associated with these embodiments naturally generates curves and flats in the sheet being formed, but these curves and flats do not correspond to die surfaces. In some embodiments, the flat surfaces are not in contact with the die surfaces until the very last moment in which some surfaces may meet or leave a small gap. Traditional dies have 4 flat surfaces that meet and create sharp corners creating weakness, whereas embodiments of die used in the present invention can produce a negative Gaussian curvature. This latter die is referred to herein as the "Jet Air Die."

Figure 22:
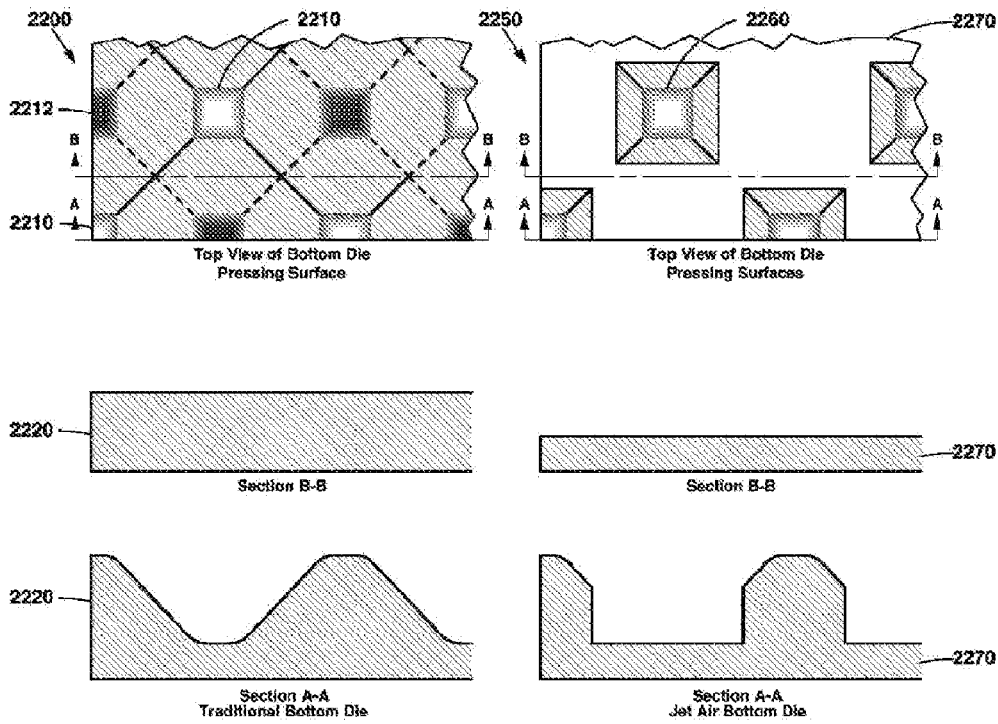
FIGS. 22-23 illustrate how exemplary embodiments of the invention allow the natural formation of regions of negative Gaussian curvature at the intersections of pyramidal frustums and how traditional die manufacturing techniques are unable to form such regions.
Figure 23:
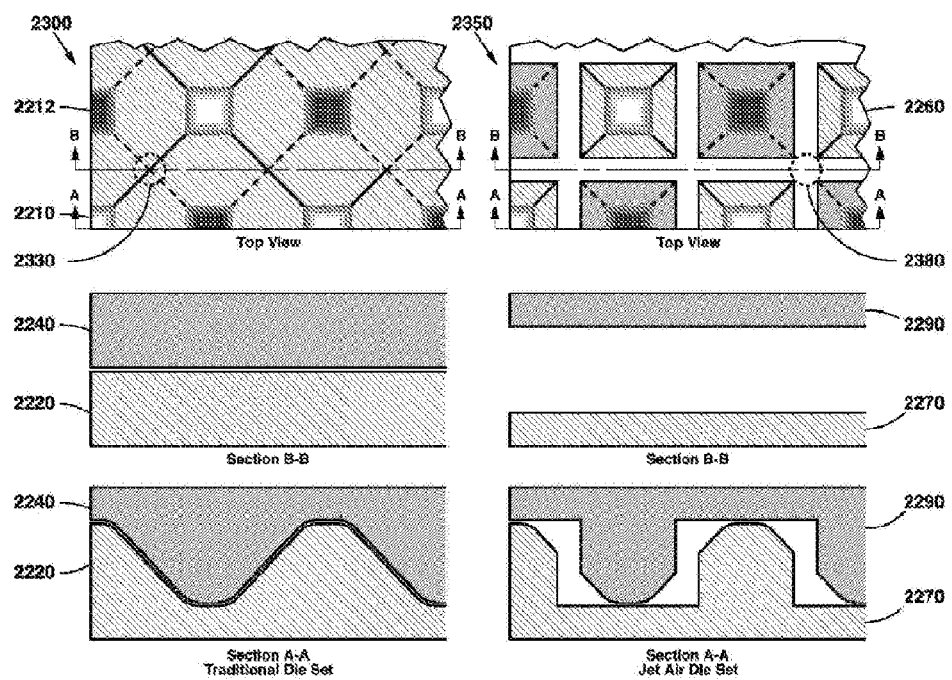

FIGS. 22-23 illustrate how exemplary embodiments of the invention allow the natural formation of regions of negative Gaussian curvature at the intersections of pyramidal frustums and how traditional die manufacturing techniques are unable to form such regions. The left-hand images 2200 in FIG. 22 illustrate a lower die 2220 manufactured according to traditional techniques and the right-hand images 2250 in FIG. 22 illustrate a lower die 2270 manufactured according to an exemplary embodiment of the invention. It should be noted that die 2220 is hypothetical and is offered for contrast with die 2250. Although die 2220 may embody some aspects of the invention described herein, no such die 2200 is known.

Die 2220 includes a set of up-pointing pyramidal frustum nodes 2210 and a set of down-pointing pyramidal frustum nodes 2212. The middle and bottom views are cutaways of the bottom die 2220 through sections B-B and A-A, respectively, of the top view. Die 2270 includes a set of up-pointing pyramidal frustum nodes 2260. The middle and bottom views are cutaways of the bottom die 2270 through sections B-B and A-A, respectively, of the top view.

The die 2200 manufactured according to traditional techniques has one continuous surface with alternating peaks and valleys, while the die 2250 manufactured according to an embodiment of the invention has die posts extending upward from a flat bottom surface, with wide areas between the posts where much of the sheet being formed never comes in contact with the dies.

In the die 2200 manufactured according to traditional techniques, the region 2330 where four flat surfaces of neighboring pyramid frustums meet with different slopes will force the sheet being formed to have sharp corners. By contrast, the corresponding region 2380 of the die 2350 manufactured according to an embodiment of the invention is not in contact with the sheet being formed, so the material will naturally pull itself into a region of negative Gaussian curvature with significantly reduced stress, allowing greater depth of draw without fracturing the sheet.

The left-hand images 2300 in FIG. 23 illustrate coupled dies manufactured according to traditional techniques and the right-hand images 2350 in FIG. 23 illustrate coupled dies manufactured in according to an exemplary embodiment of the present invention. The upper dies are shown with a closely spaced hatch pattern sloping up to the right, while the lower dies are shown with a widely spaced hatch pattern sloping up to the left. In the top view of images 2300, only the bottom die is shown as if the top die 2340 was transparent. In the top view of images 2350, only the bottom die and the pyramidal frustums of the top die are shown, as if the top surface of the top die 2390 was transparent.

FIGS. 24a-24e illustrate a method of manufacturing a die-pair 2400 used to form a core sheet, according to an exemplary embodiment of the invention. The method may be utilized to produce a cellular structural core which can be pressed or rolled to a greater cell depth than traditional die designs. By using the dies produced by this method, the core may consist of an array of regularly spaced, pyramidal frustum bases that extend alternately in opposite directions above and below the central plane. In some embodiments, once the material has been formed, each face of each upward-pointing pyramidal frustum base may merge with a face of a neighboring downward-pointing pyramidal frustum base, so there may be no obvious vestige of the original central plane.

Figure 24A:
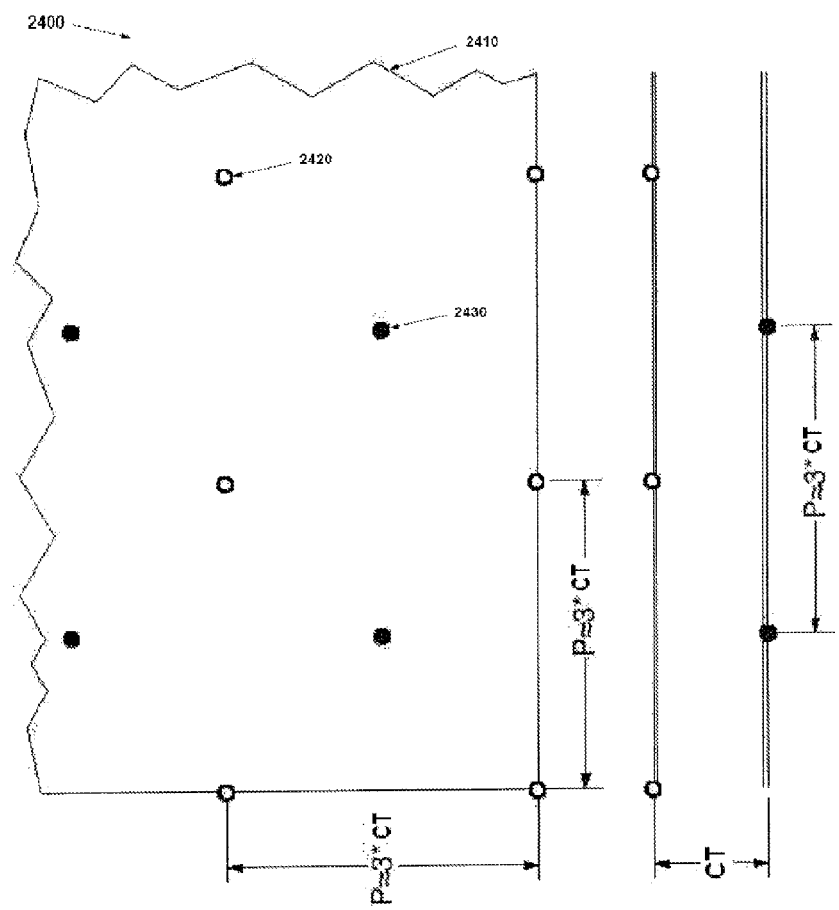
FIGS. 24a-24e illustrate a method of manufacturing a die used to form a core sheet, according to an exemplary embodiment of the invention.

FIG. 24a illustrates the first step of manufacturing a die-pair 2400, in accordance with an exemplary embodiment of the invention. In this step, an array of square upper die posts 2420 and square lower die posts 2430 are formed. The die posts extend from a sheet 2410, with the flat faces of the squares facing directly towards neighboring nodes. Sheet 2410 is illustrated with both upper and lower die posts, but this representation is only provided to aid the reader's understanding of the relative positioning of the nodes. In practice, the upper die posts will be placed on one sheet and the lower die posts on another, as is shown on the right side of FIGS. 24a-e. Further, FIGS. 24a-e illustrate square die posts, but some embodiments may include polygonal nodes of different shapes. In the embodiment illustrated in FIG. 24a, the node pitch is three times the core thickness, but other pitches may be used without deviating from the scope of the invention. The node pitch may be selected to optimize the slopes of the pyramidal frustum bases of the formed core sheet.

Figure 24B:
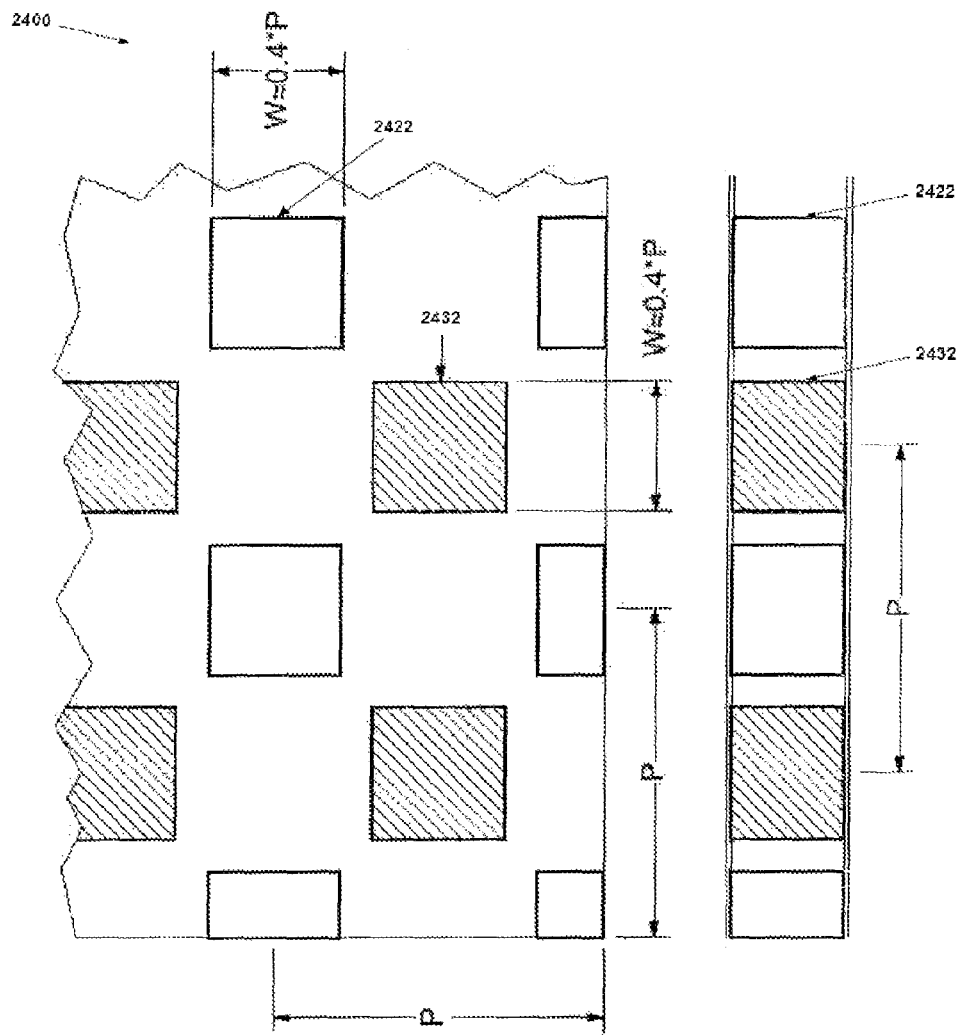

FIG. 24b illustrates the second step of manufacturing a die-pair 2400, in accordance with an exemplary embodiment of the invention. In this step, polygonal columns 2422 and 2432 are formed. The columns have height equal to the core thickness. In this embodiment, the width of the columns is approximately equal to four tenths of the node pitch, leaving a gap of approximately one tenth of the node pitch between the sides of adjacent columns of the upper and lower dies. This gap enables free flow of core material during pressing/rolling, which facilitates the formation of a compact region of negative Gaussian curvature where four neighboring pyramidal frustum bases meet near the central plane.

Figure 24C:
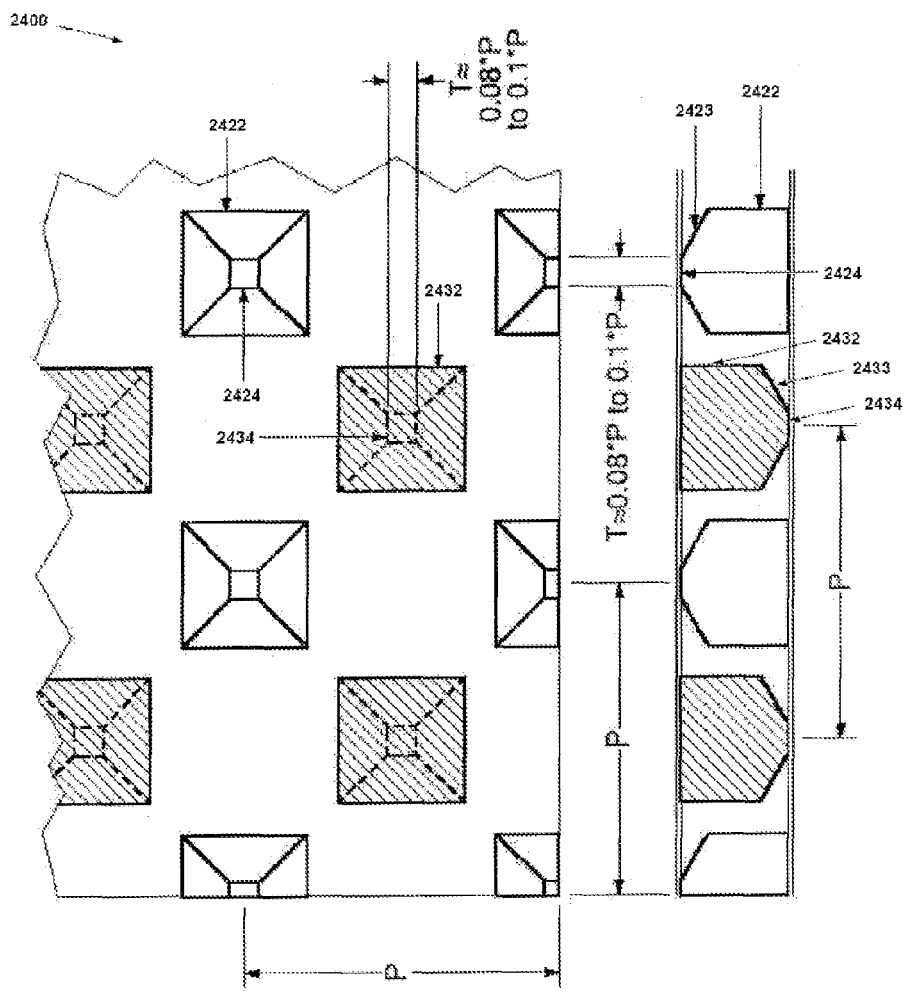

FIG. 24c illustrates the third step of manufacturing a die-pair 2400, in accordance with an exemplary embodiment of the invention. In this step, flat polygonal nodes 2424 and 2434 are added to the upper and lower die posts, respectively. In the embodiment illustrated in FIG. 24c, the width of the polygonal nodes is approximately one tenth to one twelfth of the node pitch. In some embodiments, this width ratio provides an optimum depth of draw while still providing adequate surface for adhesion between the core and the skins. As can also be seen in FIG. 24c, this step will result in formation of sloped faces 2423 and 2434 of the upper and lower pyramidal frustums.

Figure 24D:
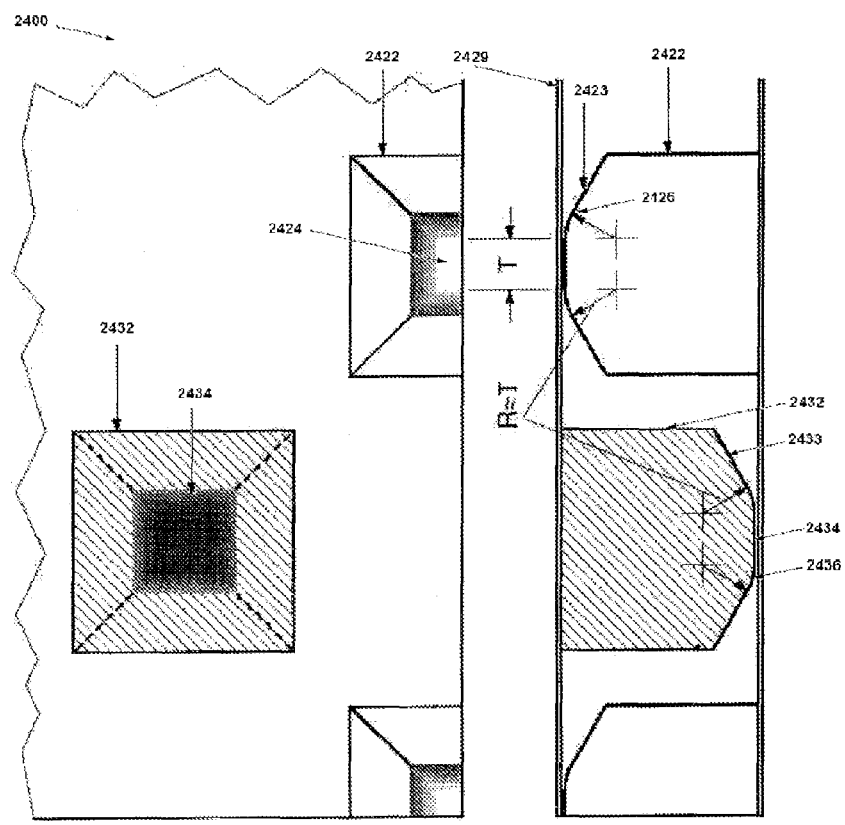

FIG. 24d illustrates the fourth step of manufacturing a die-pair 2400, in accordance with an exemplary embodiment of the invention. In this step, a radius is selected for cylindrical transition regions 2426 and 2436. In this embodiment, the radius for the cylindrical transition regions is approximately equal to the width of the polygonal node. In some embodiments, this value provides an optimum rounding of pyramid corners to facilitate flow of material and distribution of tensile forces during forming, without occupying unnecessary space.

Figure 24E:
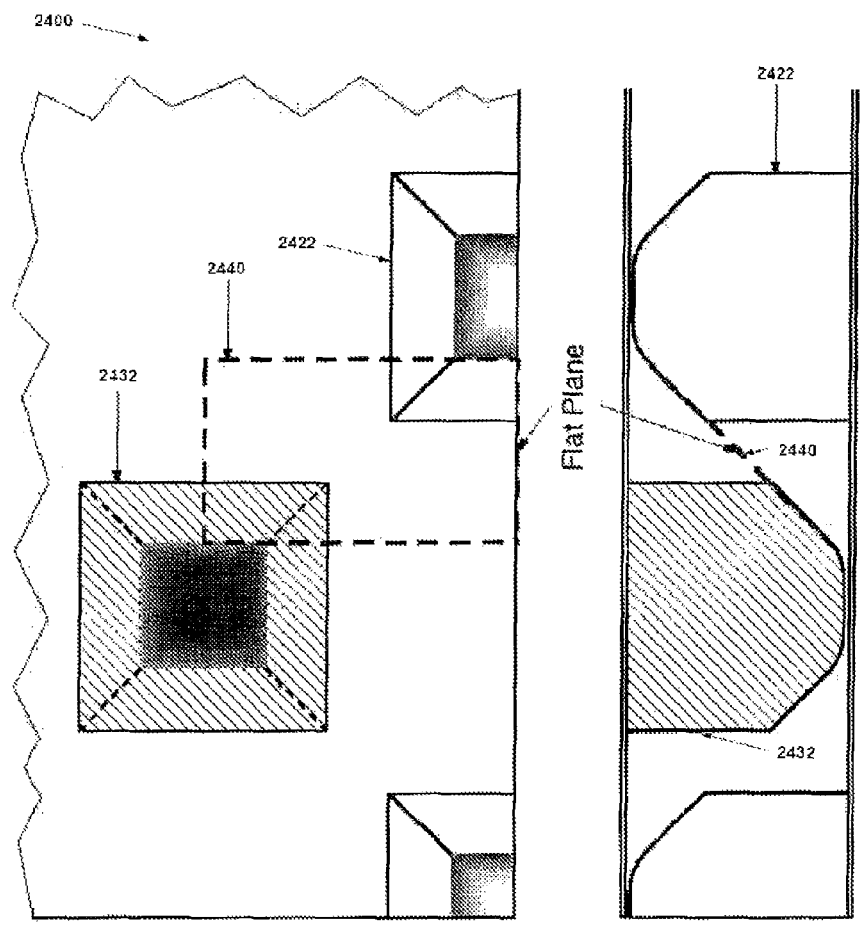

FIG. 24e illustrates the fifth step of manufacturing a die-pair 2400, in accordance with an exemplary embodiment of the invention. In this step, the slope of the faces are formed. In some embodiments, this slope is selected so that the faces of upward-pointing pyramidal frustums bases of the core sheet are essentially coplanar with corresponding faces of neighboring downward-pointing pyramidal frustum bases, as illustrated by plane 2440. For cores to be used between two flat skins, this slope may be approximately equal to 45° to optimize the balance between crush, torsion, flexure, and other strengths. In some embodiments, the alignment of pyramid faces can maximize the transfer of forces between upper and lower pyramids and therefore maximize the transfer of forces between upper and lower skins. Note that in some embodiments, the fifth step, described here with reference to FIG. 24e, is performed in conjunction with the third step, described above with reference to FIG. 24c.

Also, the plurality of columns 2422 and 2432 are illustrated in FIGS. 24b-e as having constant width in the direction perpendicular to the plane of the sheet, some embodiments may include columns which do not have a constant width. In those embodiments, the columns are configured to make no contact with the sheet of core material during any stage of the forming process Although not illustrated in FIGS. 24a-e, the method may also include deburring/polishing operations on the post corners where the pyramid faces meet. The resulting relatively sharp corners can form stiffening edges at the corners of each core pyramid, reaching from the cylindrical transition regions near the skins to the regions of negative Gaussian curvature near the central plane.

Figure 25:
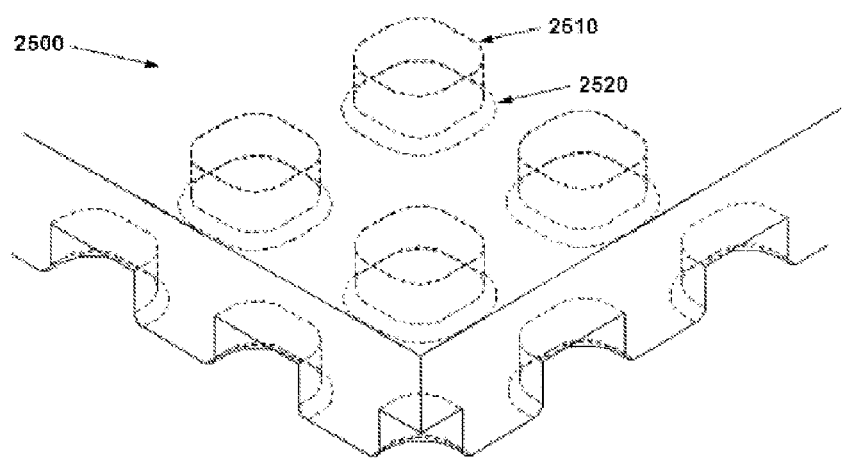
FIG. 25 is an isometric view of a female die used to form a core sheet, according to an exemplary embodiment of the invention.

Other embodiments may utilize the features of the dies described above, but instead form a male and female die set for pressing core material so that all nodes extend in a single direction from one side. FIG. 25 is an isometric view of a female die 2500 used to form a core sheet, according to an exemplary embodiment of the invention. Female die 2500 includes cavity 2510 and transition region 2520 from the cavity walls to the base of the die.

Figure 26:
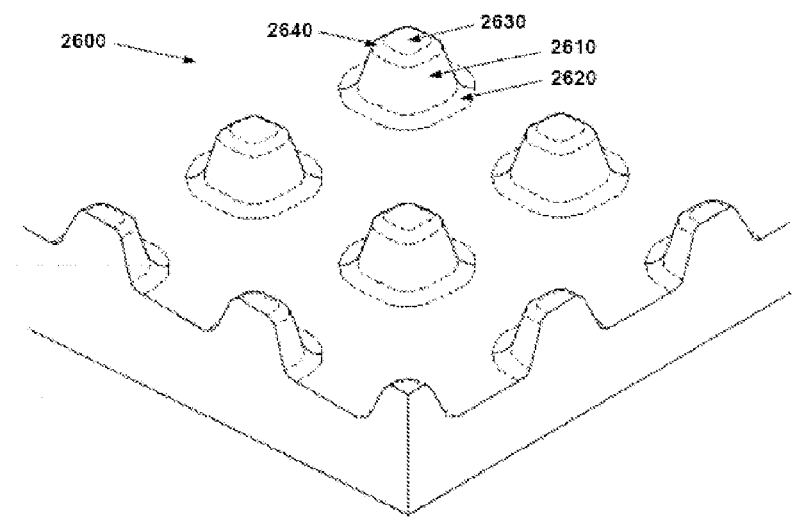
FIG. 26 is an isometric view of a male die used to form a core sheet, according to an exemplary embodiment of the invention.

FIG. 26 is an isometric view of a male die 2600 used to form a core sheet, according to an exemplary embodiment of the invention. Male die 2600 includes die posts 2610, transition regions 2620 from the post walls to the base of the die, polygonal node 2630, and cylindrical transition regions 2640 from the polygonal nodes 2630 to the walls of the die posts.

Figure 27:
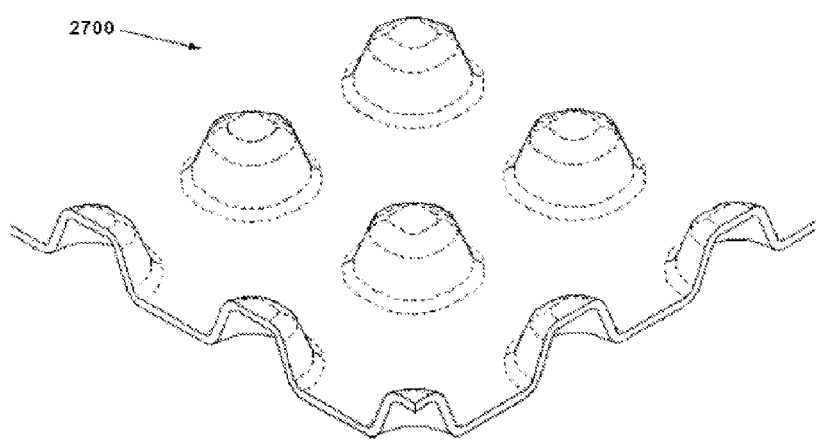
FIG. 27 is an isometric view of a core sheet produced using the female and male dies of FIGS. 25 & 26.

FIG. 27 is an isometric view of a core sheet 2700 produced using the female and male dies of FIGS. 25 & 26. In these embodiments, all nodes extend in one direction from a base sheet, rather than extending in both directions from a central plane. The aforementioned principles of die post design can maximize depth of draw as in other embodiments of the invention, but in this case with full rings of core material attach to one or both skins. This produces a sandwich that may be somewhat heavier than the multi-oriented bases embodiment above, but can be formed to more complex shapes without buckling. The walls of the core are formed by stretching the core material between the cylindrical transition region of the female dies and the cylindrical transition region of the male die. In one embodiment, a three-layer formed core sandwich structure has a somewhat higher density than the original three-layer core but a greater formability on one face.

In some embodiments, two of the cores can be combined, where the nodes of one core fit in the spaces between nodes of the other core, producing a four-layer sandwich with twice as many support pyramids per given area. This may give the structure significantly increased crush strength, while improving its formability with minimum buckling and crimping during forming.

Figure 28:
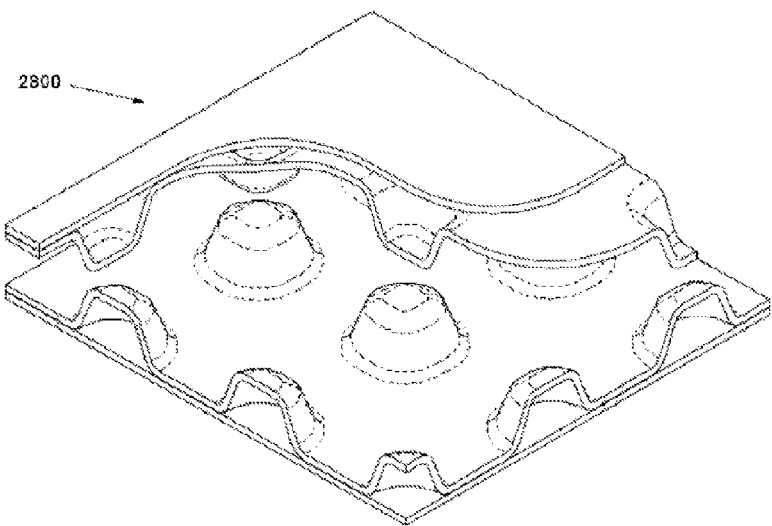
FIG. 28 is a cut-away isometric view of a four-layer formed core sandwich structure produced by joining two core sheets with two outer skins, according to exemplary embodiments of the invention.

FIG. 28 is a cut-away isometric view of a four-layer formed core sandwich structure 2800 produced by joining two core sheets with two outer skins, according to exemplary embodiments of the invention. This configuration can have twice as many nodes per unit area, and, as a result, can have significantly improved crush strength while applying the buckling resistance to both skins.

Figure 29:
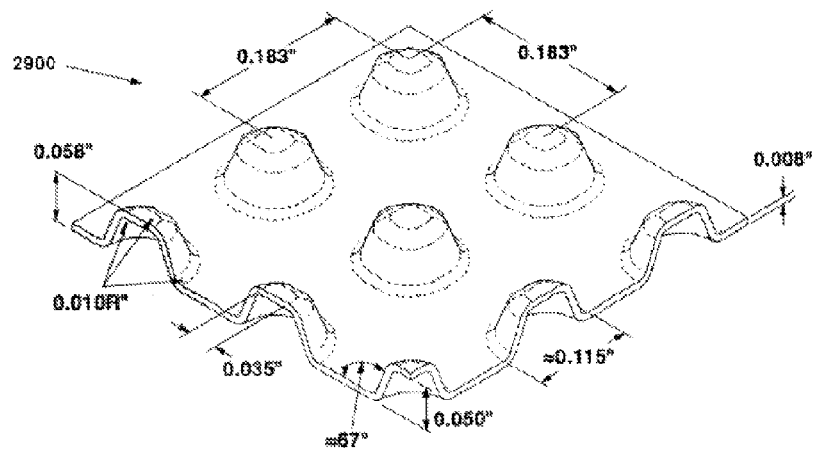
FIG. 29 is an isometric view of a core sheet illustrating a selection of dimensions, according to an exemplary embodiment of the invention.
Figure 30:
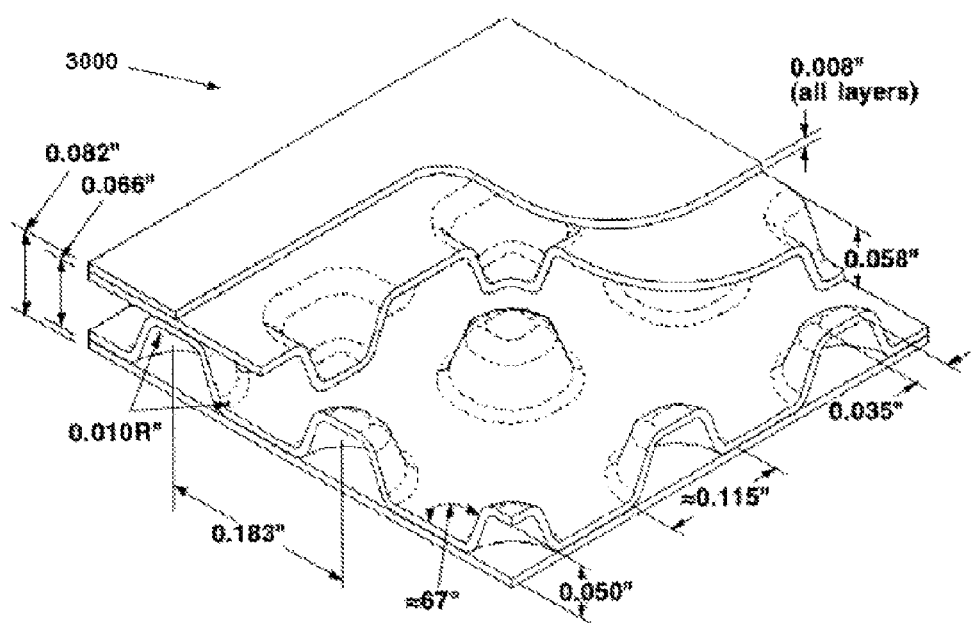
FIG. 30 is an isometric view of a four-layer formed core sandwich structure illustrating a selection of dimensions, according to an exemplary embodiment of the invention.

FIG. 29 is an isometric view of a core sheet 2900 illustrating a selection of dimensions, according to an exemplary embodiment of the invention. FIG. 30 is an isometric view of a four-layer formed core sandwich structure 3000 illustrating a selection of dimensions, according to an exemplary embodiment of the invention. Note that in some embodiments, the upper core is identical to the lower core, but is inverted and offset.

Although this application makes frequent reference to die posts for formation of the core structure, one of ordinary skill in the art will readily appreciate that rollers taking the same shape as the dies could be equivalently used to form the cores described above.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

What is claimed is:

1. A formed core comprising a first and second plurality of pyramidal frustum bases, the first plurality of pyramidal frustum bases extending in a first direction and the second plurality of pyramidal frustum bases extending in a second direction different from the first direction, and wherein each pyramidal frustum base comprises:

a node comprising a convex regular polygon, the convex regular polygon comprising a plurality of sides, wherein the convex regular polygon is oriented in a first plane and wherein each side of the polygon of the node of each of the first plurality of pyramidal frustum bases is parallel to a side of the polygon of the node of at least one of the second plurality of pyramidal frustum bases;
a plurality of faces, each one of the plurality of faces extending from each of the sides of the polygon of each node of the first plurality of frustum bases to a side of the polygon of each of the second plurality of frustum bases;
a region of intersection of four faces, each of the four faces selected from a different one of the group consisting of two of the first plurality of pyramidal frustum bases and two of the second plurality of pyramidal frustum bases, wherein the region of intersection comprises a region of negative Gaussian curvature; and
at least one cross-section in a second plane parallel to the first plane, wherein the first and second planes are not co-planar and wherein at least one cross-section comprises a polygon with the same number of sides as the polygon of the node.

2. The formed core of claim 1, wherein a pyramidal frustum base further comprises a cylindrical transition region from each side of the polygon of each node to the corresponding face, wherein the axis of the cylindrical transition region is parallel to the side of the polygon.

3. The formed core of claim 1, wherein the regular convex polygon comprises a square.

4. The formed core of claim 1, wherein each of the plurality of faces is sloped at 45°.

5. A formed core sandwich structure comprising:
an inner skin;
an outer skin; and
a first formed core, wherein a formed core comprises a first and second plurality of pyramidal frustum bases, the first plurality of pyramidal frustum bases extending in a first direction and the second plurality of pyramidal frustum bases extending in a second direction different from the first direction, and wherein each pyramidal frustum base comprises:
a node comprising a convex regular polygon, the convex regular polygon comprising a plurality of sides, wherein the convex regular polygon is oriented in a first plane and wherein each side of the polygon of the node of each of the first plurality of pyramidal frustum bases is parallel to a side of the polygon of the node of at least one of the second plurality of pyramidal frustum bases;
a plurality of faces, each one of the plurality of faces extending from each of the sides of the polygon of each node of the first plurality of frustum bases to a side of the polygon of each of the second plurality of frustum bases;
a region of intersection of four faces, each of the four faces selected from a different one of the group consisting of two of the first plurality of pyramidal frustum bases and two of the second plurality of pyramidal frustum bases, wherein the region of intersection comprises a region of negative Gaussian curvature; and
at least one cross-section in a second plane parallel to the first plane, wherein the first and second planes are not co-planar and wherein at least one cross-section comprises a polygon with the same number of sides as the polygon of the node.

6. The formed core sandwich structure of claim 5, wherein a pyramidal frustum base further comprises a cylindrical transition region from each side of the polygon of each node to the corresponding face, wherein the axis of the cylindrical transition region is parallel to the side of the polygon.

7. The formed core sandwich structure of claim 5, further comprising a second formed core.

8. The formed core sandwich structure of claim 7, further comprising a middle skin.

9. The formed core sandwich structure of claim 5, wherein the first formed core is brazed to the inner and outer skins.

10. The formed core sandwich structure of claim 5, wherein a formed core further comprises at least one perforation.

* * * * *